United States Patent
Fedorynski et al.

(10) Patent No.: US 11,934,988 B1
(45) Date of Patent: Mar. 19, 2024

(54) DISPATCH AND LOCAL DELIVERY INTERFACE FOR AUTONOMOUS VEHICLES

(71) Applicant: WAYMO LLC, Mountain View, CA (US)

(72) Inventors: Pawel Fedorynski, Menlo Park, CA (US); Eric Friedman, Menlo Park, CA (US); Jia-Yu Aw, Mountain View, CA (US); Cameron Blume, San Francisco, CA (US); Samrat Kansara, San Francisco, CA (US); Matthew Corey Hall, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 45 days.

(21) Appl. No.: 17/487,071

(22) Filed: Sep. 28, 2021

Related U.S. Application Data

(63) Continuation-in-part of application No. 17/352,456, filed on Jun. 21, 2021.

(Continued)

(51) Int. Cl.
*G06Q 10/083* (2023.01)
*G06F 9/54* (2006.01)
*G06Q 10/1093* (2023.01)

(52) U.S. Cl.
CPC .......... *G06Q 10/083* (2013.01); *G06F 9/547* (2013.01); *G06Q 10/1093* (2013.01)

(58) Field of Classification Search
CPC ... G06Q 10/083; G06Q 10/1093; G06F 9/547

(Continued)

(56) References Cited

U.S. PATENT DOCUMENTS 11,361,594 B1   6/2022  Copeland et al.
2015/0046187 A1* 2/2015  Johnson ............... G06Q 50/30
                                                        705/3

(Continued)

OTHER PUBLICATIONS

Kuhrt, Matt, et. al.; "Ride-hailing companies continue to partner with providers to reduce no-shows, but does it work?" https://www.fiercehealthcare.com/tech/ride-sharing-companies-continue-to-partner-providers-attempting-to-reduce-no-shows; Health Tech; Mar. 2, 2018. (Year: 2018).*

(Continued)

*Primary Examiner* — Dione N. Simpson
(74) *Attorney, Agent, or Firm* — Botos Churchill IP Law

(57) ABSTRACT

The technology relates to a seamless interface between an autonomous vehicle service provider and one or more ride-sharing, ride-hailing or delivery partner companies, in order to provide timely, efficient rider or delivery services and support. A partner trip application programming interface (API) provides robust features to the ridesharing or ride-hailing partner companies and also supports delivery of meals, groceries, packages or other cargo. For instance, the API may be employed with delivery partners (e.g., food, package or bulk cargo delivery), and/or for concierge services (e.g., a hotel or medical provider or an e-commerce specialist that coordinates deliveries). The technology supports both ad hoc and scheduled trips. Agents for different partners may schedule trips to or from specific stores or other (geofenced) locations, and observe and manage trips for an entire enterprise. Permissions can be tailored for each agent.

20 Claims, 19 Drawing Sheets

Related U.S. Application Data

(60) Provisional application No. 63/044,385, filed on Jun. 26, 2020.

(58) Field of Classification Search
USPC .............................................................. 705/5
See application file for complete search history.

(56) References Cited

U.S. PATENT DOCUMENTS

| | | |
|---|---|---|
| 2016/0320195 A1 | 11/2016 | Liu et al. |
| 2017/0270790 A1* | 9/2017 | Neiger ................... G08G 1/127 |
| 2017/0330144 A1* | 11/2017 | Wakim ................... H04W 4/023 |
| 2018/0293687 A1* | 10/2018 | Hardee ................... G08G 1/202 |
| 2019/0137290 A1* | 5/2019 | Levy ................... G01C 21/3461 |
| 2019/0180236 A1* | 6/2019 | Greenberger ........ G05D 1/0291 |
| 2019/0196503 A1 | 6/2019 | Abari et al. |
| 2019/0317526 A1* | 10/2019 | Goldman ............... G06Q 10/02 |
| 2019/0325546 A1* | 10/2019 | Hagestad ......... G06Q 10/06315 |
| 2020/0211140 A1* | 7/2020 | Horton ............. G06Q 10/06315 |
| 2020/0265727 A1* | 8/2020 | Priest ................... G08G 5/0069 |

OTHER PUBLICATIONS

Shelton, Kyle; "How Can Ride-Sharing Companies Partner with Public Transit?"; Government Technology; https://www.govtech.com/transportation/how-can-ride-sharing-companies-partner-with-public-transit.html; Sep. 22, 2016. (Year: 2016).*

Luna, Nancy; "Tech Tracker: DoorDash to deploy self-driving vehicles in San Francisco"; https://www.nr.com/technology/tech-tracker-doordash-deploy-self-driving-vehicles-san-francisco; January, 3, 2019. (Year: 2019).

* cited by examiner

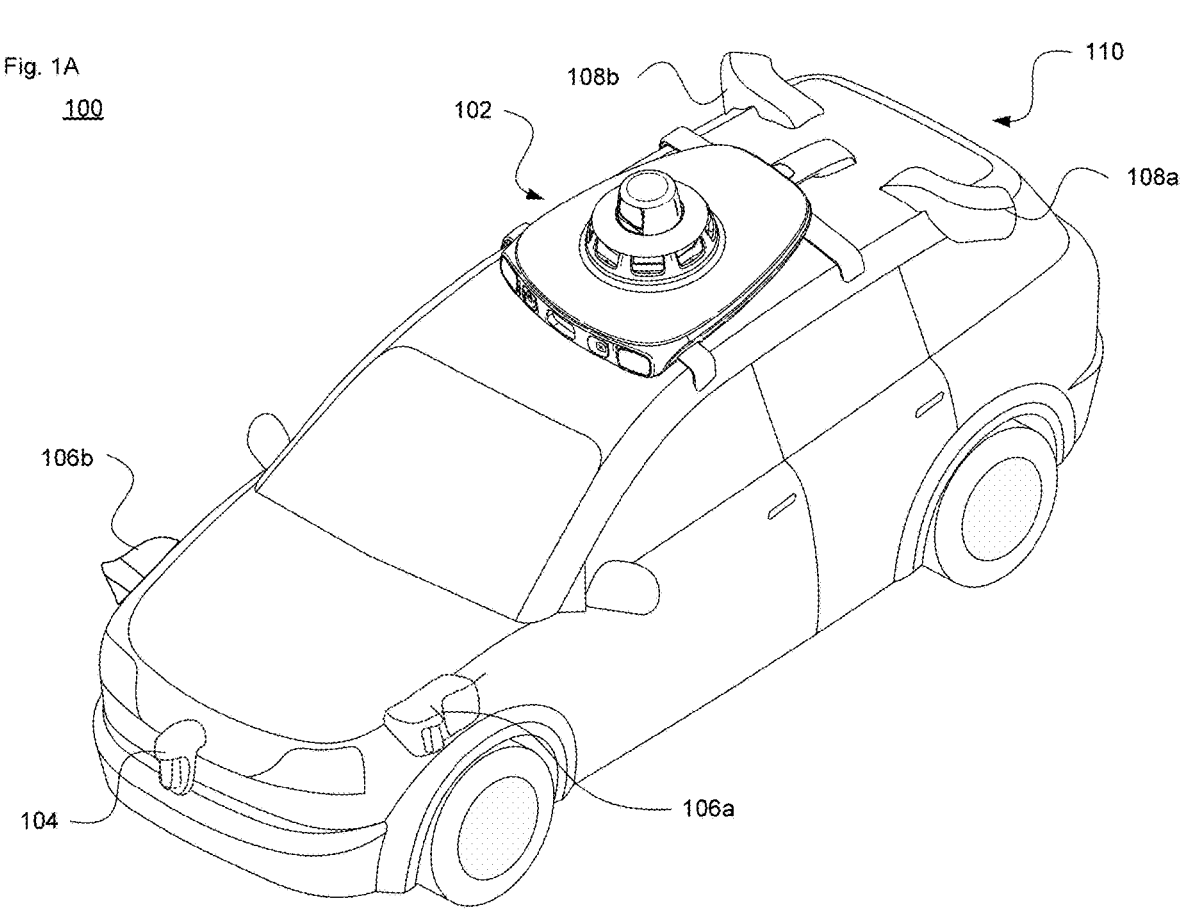

120

140

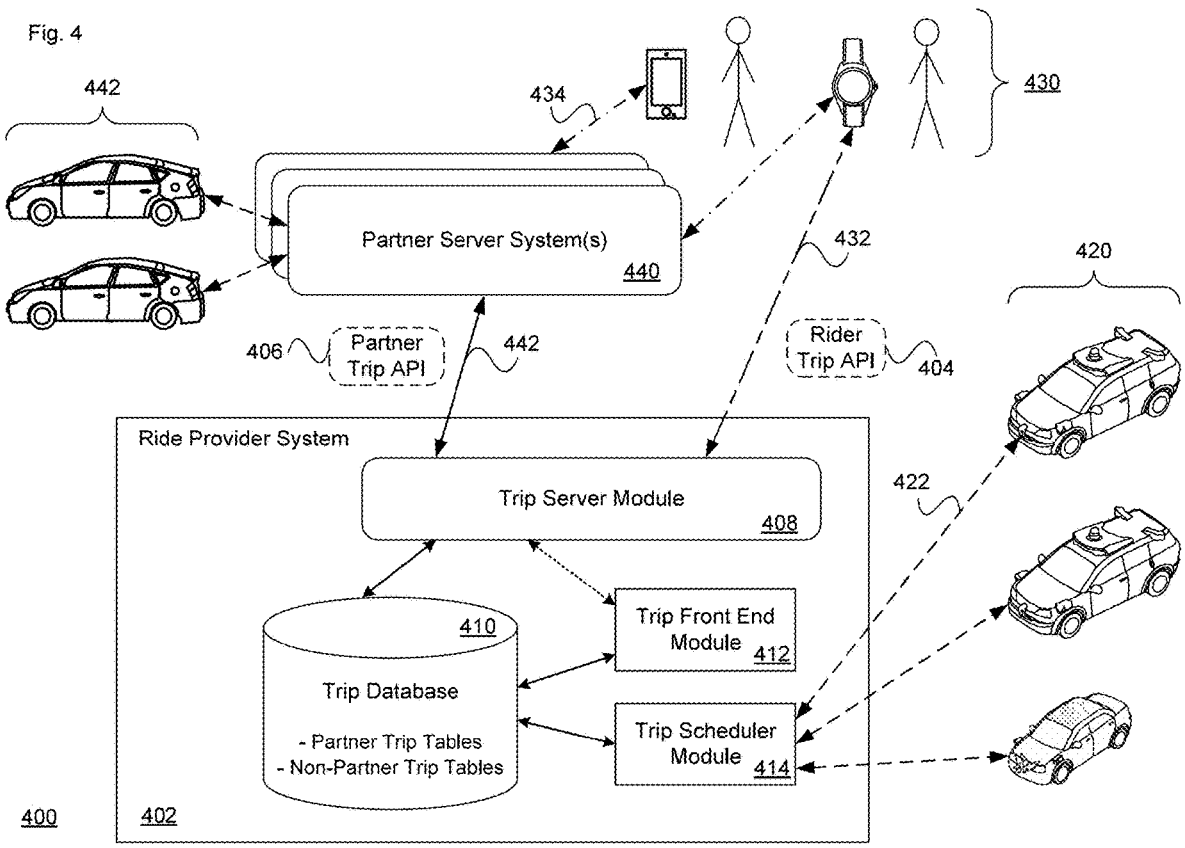

Estimate Duration To Pickup
- Input: latitude/longitude
- Output: time (e.g., minutes or seconds); error details
522

Propose Trip Plan
- Input: waypoint(s)
- Output: time estimate(s), fare, other trip details
524

Create Trip
- Input: trip proposal token
- Output: trip details or error indication if trip cannot be created
526

Cancel Trip
- Input: request including trip identifier
- Output (other than pullover): error message if no such trip or if trip is no longer active
528

Request Support Callback
- Input: trip identifier, customer #
- Output (other than a callback): error message, contact information
530

Create Trip Feedback
- Input: trip identifier
- Output: text string with feedback, or message indicating error or other condition
532

Get Trip
- Input: trip identifier
- Output: trip status information, vehicle details, etc.
534

Unlock Doors
- Input: trip identifier
- Output (other than unlocking the doors): error message with reason for error
536

600

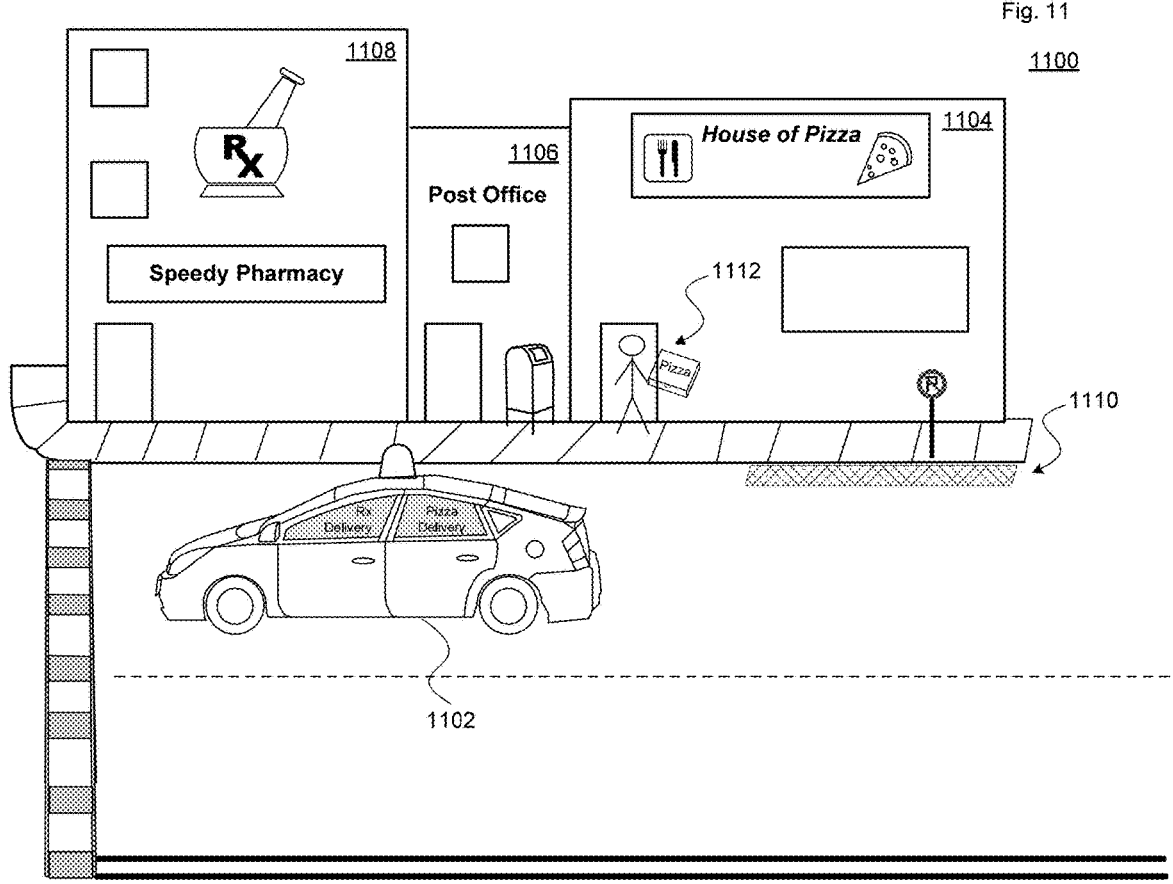

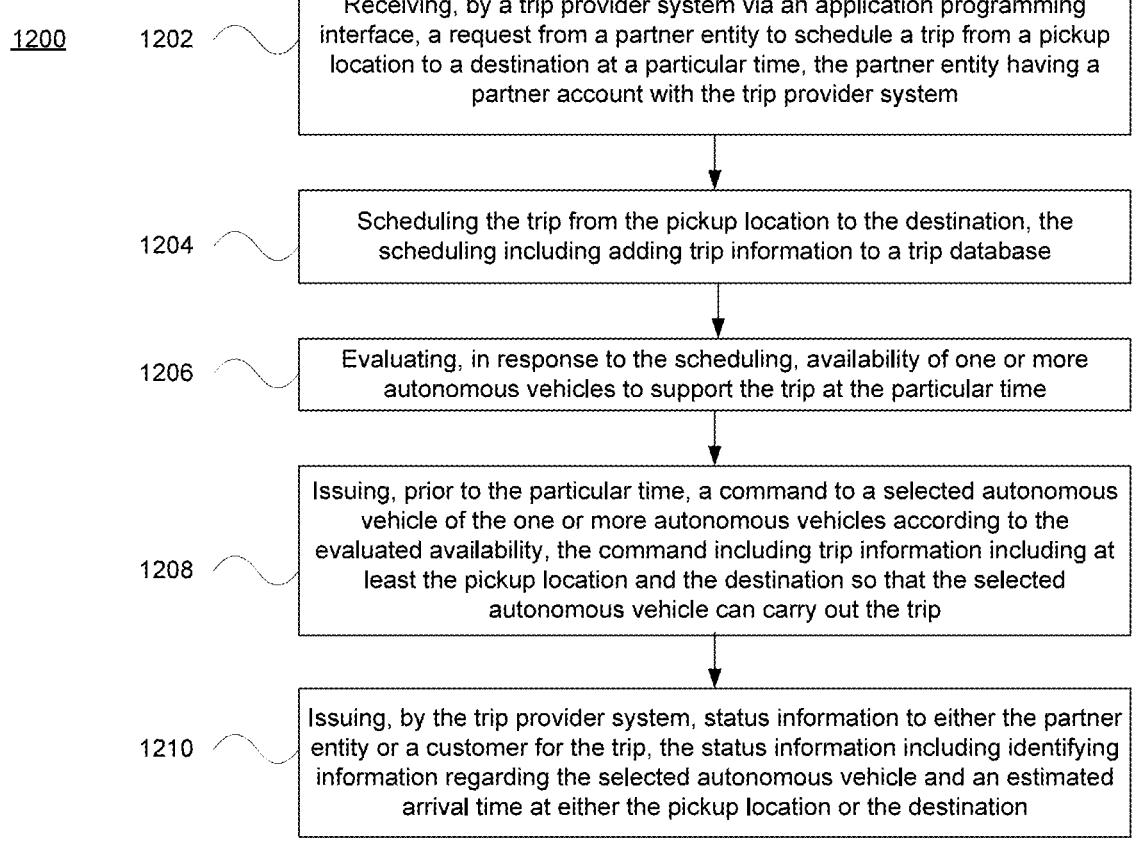

DISPATCH AND LOCAL DELIVERY INTERFACE FOR AUTONOMOUS VEHICLES

CROSS-REFERENCE TO RELATED APPLICATIONS

This application is a continuation-in-part of U.S. patent application Ser. No. 17/352,456, filed Jun. 21, 2021, which claims the benefit of the filing date of U.S. Provisional Patent Application No. 63/044,385, filed Jun. 26, 2020, the entire disclosures of which are incorporated by reference herein.

BACKGROUND

Autonomous or self-driving vehicles, in particular vehicles that do not require a human driver, can be used to transport passengers from one location to another. Such vehicles may operate in a fully autonomous mode without a person providing driving input. In this driving mode, the vehicle may make all of the driving decisions. The vehicles may also operate in a partially autonomous mode, where a human operator is involved in at least some of the driving decisions.

In ridesharing or ride-hailing situations, customers may request transportation using an app on his or her mobile device. And in package delivery situations, customers may request that packages are delivered to a specific address at a particular time. The app may allow the customer to indicate a pickup or drop-off location, a time for the pickup or drop-off, etc. In some instances, the app may link the customer directly with the autonomous vehicle service provider. In other instances, a ridesharing or ride-hailing company or other entity may partner with the autonomous vehicle service provider. While a person awaiting pickup or a passenger may not be aware of this ridesharing partnership, how rides are scheduled and operated may be quite different from a direct customer interface. This can complicate the process, resulting in missed pickups or scheduling delays, among other problems.

BRIEF SUMMARY

The technology relates to a seamless interface between an autonomous vehicle service provider and one or more ridesharing, ride-hailing or delivery partner companies, in order to provide timely, efficient rider or delivery services and support. A partner trip application programming interface (API) provides robust features to the ridesharing or ride-hailing partner companies and also supports delivery of meals, groceries, packages or other cargo.

In one aspect, the API enables a partner company to determine how quickly an autonomous vehicle from the service provider could pick up a rider from a given location, as well as the cost of the ride. This can potentially be accomplished with more reliable real-time information than the partner company could obtain from human drivers for vehicles in their own fleet. The service provider may use the API to manage partner-based trips, either alone or in conjunction with direct customer-scheduled trips. Whichever alternative is employed provides seamless operation to the rider.

The API is not limited to partner ridesharing. For instance, according to other aspects of the technology, the API may also be employed with delivery partners (e.g., food, package or bulk cargo delivery), and/or for concierge services (e.g., a hotel or medical provider or an e-commerce specialist that coordinates deliveries). By way of example the technology supports both ad hoc and scheduled trips. Agents for different partners may be authorized to schedule trips to or from specific stores or other locations, observe and manage trips for an entire enterprise, etc. Trip-related permissions can be tailored for each agent, for instance as authorized by a given delivery partner. This gives each partner maximum flexibility while enabling the rider provider system to provide a high level of service.

According to one aspect of the technology, a method comprises receiving, by one or more processors of a trip provider system via an application programming interface, a request from a partner entity to schedule a trip from a pickup location to a destination at a particular time, the partner entity having a partner account with the trip provider system; scheduling, by the one or more processors, the trip from the pickup location to the destination, the scheduling including adding trip information to a trip database; evaluating, by the one or more processors in response to the scheduling, availability of one or more autonomous vehicles to support the trip at the particular time; issuing, by the one or more processors prior to the particular time, a command to a selected autonomous vehicle of the one or more autonomous vehicles according to the evaluated availability, the command including trip information including at least the pickup location and the destination so that the selected autonomous vehicle can carry out the trip; and issuing, by the one or more processors of the trip provider system, status information to either the partner entity or a customer for the trip, the status information including identifying information regarding the selected autonomous vehicle and an estimated arrival time at either the pickup location or the destination.

In one example, scheduling the trip further includes adding the trip to a trip queue. The request to schedule the trip may include a request to create a recurring trip. Here, scheduling the trip includes adding separate instances of the trip to the trip queue in accordance with the request to create the recurring trip. This process may further include removing past instances of the recurring trip from the trip queue.

In another example, the method further comprises, prior to scheduling the trip, determining whether an agent of the partner entity who initiated the request is authorized to schedule the trip. Here, determining whether the agent is authorized to schedule the trip may include confirming whether the agent is authorized to schedule the trip either from the pickup location or to the destination.

The request for the trip may be a request to deliver food or a package. Alternatively, the request for the trip may be a request to pick up a passenger from the pickup location and transport the passenger to the destination. Issuing the status information to the partner entity may include identifying at least one previously scheduled trip and transmitting the status information to the partner entity via the application programming interface. Issuing the status information to the customer may include transmitting the status information to a client device of the customer. The request to schedule the trip may include a request to create a trip having multiple stops to pick up deliveries from different locations.

The status information may identify a compartment of the vehicle that contains an item to be delivered to the destination. Alternatively or additionally, the status information may indicate whether the selected autonomous vehicle will extend a wait time at the pickup location.

The method may further comprise, prior to receiving the request to schedule the trip, issuing a list of pre-set locations to the partner entity for which a user can manage trips.

Evaluating the availability of one or more autonomous vehicles may include determining a feasibility of each autonomous vehicle to pick up multiple orders for a single trip. Evaluating the availability of one or more autonomous vehicles may include analyzing a threshold time or distance requirement for a person to reach either the pickup location or the destination. Alternatively or additionally, evaluating the availability of one or more autonomous vehicles may include evaluating whether a cargo-related modification can be made to the selected autonomous vehicle.

According to another aspect, a trip provider system is provided, which comprises a trip database configured to maintain one or more trip tables for trips serviced by a fleet of autonomous vehicles, and one or more processors operatively coupled to the database. The one or more processors are configured to: receive, via an application programming interface, a request from a partner entity to schedule a trip from a pickup location to a destination at a particular time, the partner entity having a partner account with the trip provider system; schedule the trip from the pickup location to the destination, including adding trip information to the trip database; evaluate, in response to the scheduling, availability of one or more autonomous vehicles to support the trip at the particular time; issue, prior to the particular time, a command to a selected autonomous vehicle of the one or more autonomous vehicles according to the evaluated availability, the command including trip information including at least the pickup location and the destination so that the selected autonomous vehicle can carry out the trip; and issue status information to either the partner entity or a customer for the trip, the status information including identifying information regarding the selected autonomous vehicle and an estimated arrival time at either the pickup location or the destination.

The request to schedule the trip may include a request to create a recurring trip. Here, the one or more processors may be configured to schedule the recurring trip by adding separate instances of the trip to a recurring trip table in the trip database in accordance with the request. Alternatively or additionally, issuance of the status information to the partner entity may include identification at least one previously scheduled trip and transmission of the status information to the partner entity via the application programming interface.

BRIEF DESCRIPTION OF THE DRAWINGS

FIGS. 1A-B illustrate example passenger-type vehicles configured for use with aspects of the technology.

FIG. 4 illustrates an exemplary arrangement in accordance with aspects of the technology.

FIG. 5A illustrates an example of different API elements and FIG. 5B illustrates example information input to and returned via the API elements, in accordance with aspects of the technology.

FIG. 11 illustrates a trip scenario in accordance with aspects of the technology.

FIG. 12 illustrates an example method in accordance with aspects of the technology.

DETAILED DESCRIPTION

Aspects of the technology involve providing a ridesharing service in which customers can request a self-driving vehicle, which may come with or without a human operator for driving assistance. Customers may request rides or modify scheduled trips via an app running on the user's mobile phone or other communication device. The service may allow customers to directly communicate with the ride provider company that owns or operates a fleet of self-driving vehicles. The service may also allow customers to book or modify rides via interaction with a third-party partner company that works with the ride provider company, either with the same or a different app.

For instance, the partner company may provide ridesharing or ride-hailing services for a fleet of vehicles operated by human drivers. In one scenario, the autonomous vehicles of the ride provider company's fleet may be used to provide additional coverage in high demand locations or at peak operating times (e.g., rush hour, before or after a concert or sporting event, etc.), or to serve particular areas of interest, which may or may not be served by the partner company's fleet. Such complementary services may provide benefits not only to the collaborating companies but the customers as well, as access to self-driving vehicles can provide more opportunities and more flexibility for pickups and drop-offs.

In another scenario, the partner company may provide food or package deliveries, provide concierge services to customers, or enable other services that are supported by one or more vehicles operating in an autonomous driving mode. Here, an agent of the partner company may be able to arrange for scheduled deliveries or ad hoc pick-ups. Depending on the agent's permissions set up with the service, the agent may be able to manage pick-ups and/or drop-offs for a particular store, a set of stores, or the entire enterprise. In some situations, the ride provider company may dedicate one or more vehicles to a given partner company. In other situations, the rider provide company may be tasked with managing and operating a fleet of vehicles owned by that partner company.

Example Vehicle Systems

Figure 1B:
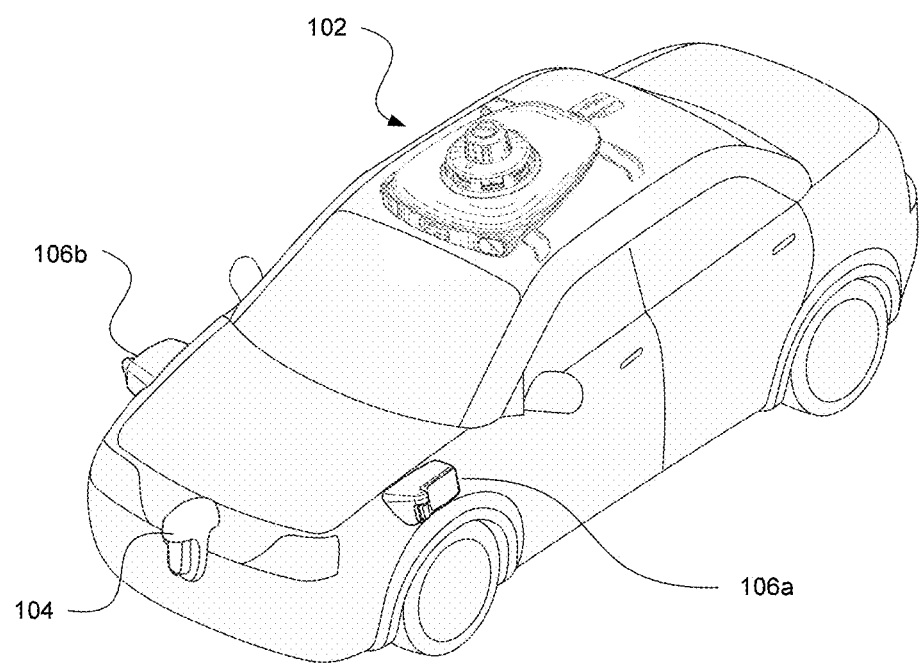

FIG. 1A illustrates a perspective view of an example passenger vehicle 100, such as a minivan or sport utility vehicle (SUV). FIG. 1B illustrates a perspective view of another example passenger vehicle 120, such as a sedan. The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106*a*, 106*b* on the driver's and passenger's sides of the vehicle may each incorporate lidar, radar, camera and/or other sensors. For example, housing 106*a* may be located in front of the driver's side door along a quarter panel of the vehicle. As shown, the passenger vehicle 100 also includes housings 108*a*, 108*b* for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Figure 1C:
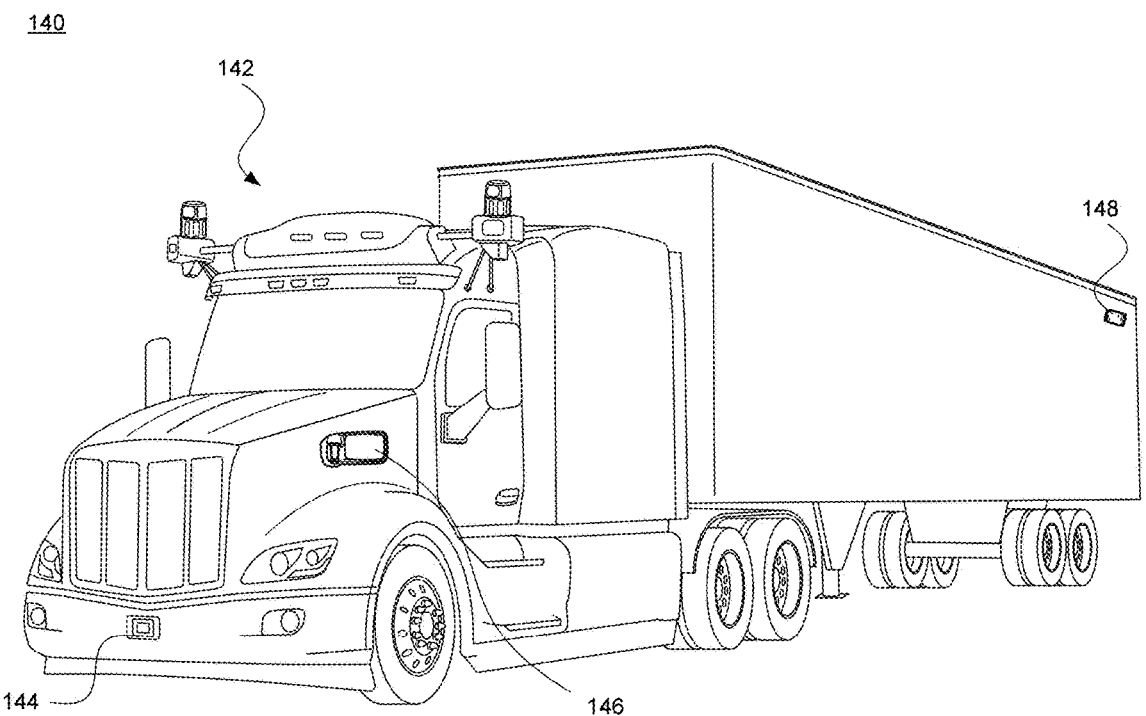
FIGS. 1C-D illustrate example trucks configured for use with aspects of the technology.
Figure 1D:
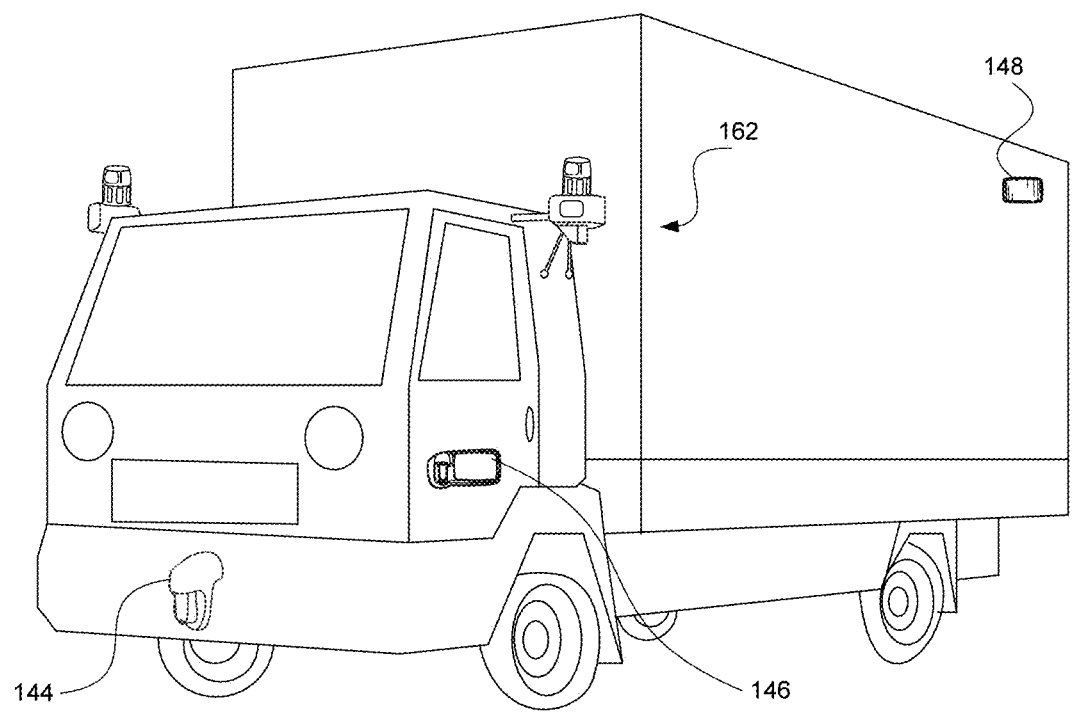

FIG. 1C illustrates a perspective view of an example truck 140, such as a large tractor-trailer type cargo truck. Similar to the passenger vehicles, the truck 140 may have a sensor suite in a roof-top housing unit 142, as well as a sensor housing 144, located at the front end of vehicle 140, and housings 146 on either side of the tractor/cab part of the vehicle 140. In addition, the trailer may have one or more sensor housings 148 distributed therealong. Each sensor suite may each incorporate lidar, radar, camera and/or other sensors. As shown, the roof-top housing unit 142 may have sensor modules extending from either side of the cab's roof, such as to provide a field of view for the sensors along the front and sides of the truck. And FIG. 1D illustrates a perspective view of another example truck 160, such as a panel truck or other local delivery vehicle. Here, in contrast to the roof-top housing unit 142, the truck 160 may have a pair of sensor suites disposed in housings 162 on either side of the vehicle.

By way of example, each sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be different types of vehicles that can transport passengers in an autonomous driving mode, including, but not limited to, cars, buses, motorcycles, trolleys, recreational vehicles, etc., as well as package transport and delivery using cargo trucks, delivery vans, and the like.

While certain aspects of the disclosure may be particularly useful in connection with specific types of vehicles, the vehicle may be one of many different types of vehicles including, but not limited to, sedans, minivans, SUVs, coupes, motorcycles, buses, recreational vehicles, emergency vehicles, food or grocery delivery vehicles, cargo vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy. Thus, reference to an autonomous driving mode includes both partial (levels 1-3) and full autonomy (levels 4-5).

Figure 2A:
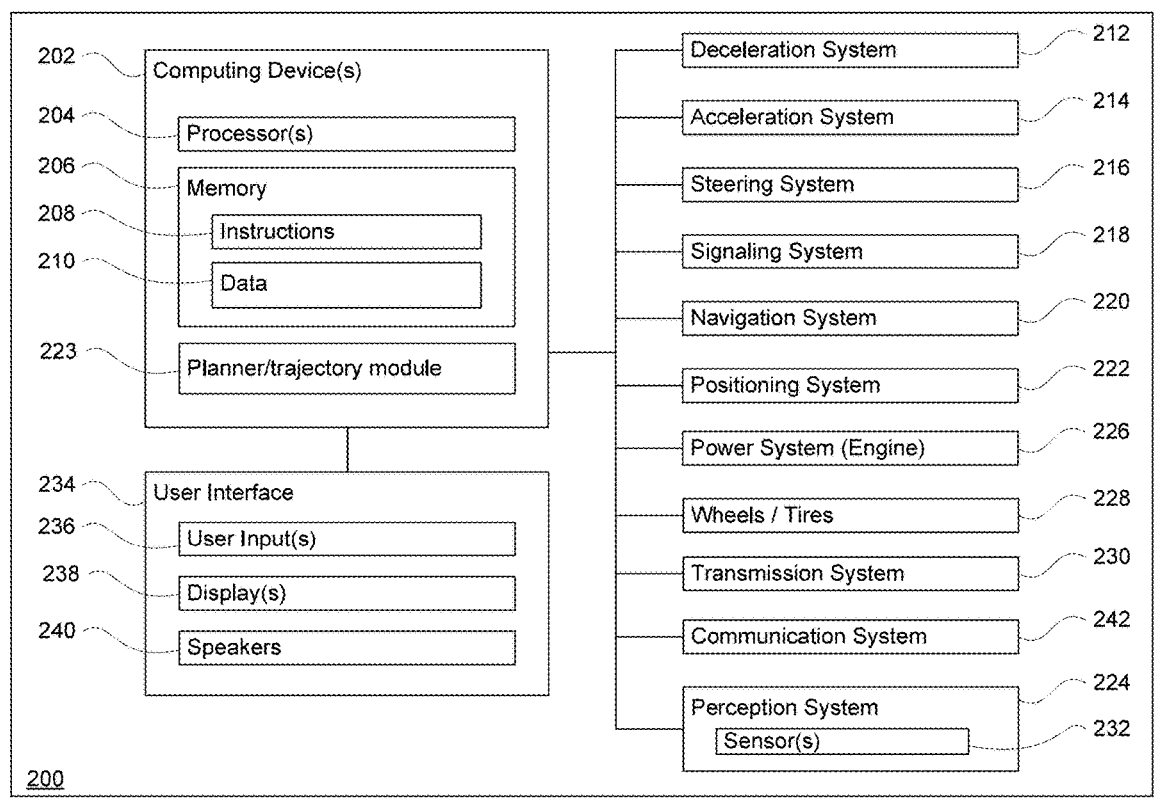
FIGS. 2A-B are block diagrams of systems of example vehicles in accordance with aspects of the technology.

FIG. 2A illustrates a block diagram 200 with various components and systems of an exemplary vehicle, such as passenger vehicles 100 or 120 or truck 160, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or obtained sensor data, which may be on board the vehicle or remote, depending on the implementation.

The processors 204 may be any conventional processors, such as commercially available central processing units (CPUs) or tensor processing units (TPUs). Alternatively, each processor may be a dedicated device such as an ASIC or other hardware-based processor. Although FIG. 2A functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system is configured to communicate with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner/trajectory module 223, in accordance with the navigation system 220, the positioning system 222 and/or other components of the system, e.g., for determining a route from a starting point to a destination or for making modifications to various driving aspects in view of current or expected traction conditions. By way of example, the planner/trajectory module 223 may determine a route upon receipt of a request to pick up a rider, to adjust the vehicle's speed and/or to change lanes from a prior planned path, etc. The request may be received by the vehicle from a backend system, such as a fleet management system.

The computing devices 202 are also operatively coupled to a perception system 224 (for detecting objects in the vehicle's environment), a power system 226 (for example, a battery and/or internal combustion engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner/trajectory module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The sensors 232 are located in one or more sensor units around the vehicle. The detected objects may be other vehicles, obstacles in the roadway, traffic signals, signs, trees, bicyclists, pedestrians, etc. The sensors 232 may also detect certain aspects of weather or other environmental conditions, such as snow, rain or water spray, or puddles, ice or other materials on the roadway.

By way of example only, the perception system 224 may include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), pressure (e.g., piezoelectric or mechanical), inertial (e.g., accelerometer, gyroscope, etc.), and/or any other detection devices that obtain data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc.

The perception system 224 may also include other sensors within the vehicle to detect objects and conditions about or within the vehicle, such as in the passenger compartment. For instance, such sensors may detect, e.g., whether a door is open or closed, the presence of one or more persons, pets, packages, etc. within the vehicle, as well as conditions within and/or outside the vehicle such as temperature, humidity, etc. This can include detecting where the passenger(s) is sitting within the vehicle (e.g., front passenger seat versus second or third row seat, left side of the vehicle versus the right side, etc.). The interior sensors may detect the proximity, position and/or line of sight of the passengers in relation to one or more display devices of the passenger compartment. For food, package or cargo delivery, the interior and/or exterior sensors may detect the location, positioning or other information about the items being delivered. For instance, strain gauges can be coupled to or integrated into securement devices, such as to detect whether straps, clips, clasps or other securement devices are properly restraining the cargo. Load cells or pressure sensors (e.g., operatively coupled to the suspension system of the trailer) can indicate whether cargo has shifted position or fallen over. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner/trajectory module 223, including adjustments in operation to deal with occlusions and other issues. In addition, the computing devices 202 may perform calibration of individual sensors, all sensors in a particular sensor assembly, or between sensors in different sensor assemblies or other physical housings.

Computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 240 may also be located within the passenger vehicle.

The passenger vehicle also includes a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include cellular connections, and the communication system may support short range communication protocols such as Bluetooth™, Bluetooth™ low energy (LE), as well as various configurations and protocols associated with the Internet, World Wide Web, intranets, virtual private networks, wide area networks, local networks, private networks using communication protocols proprietary to one or more companies, Ethernet, WiFi and HTTP, and various combinations of the foregoing.

Figure 2B:
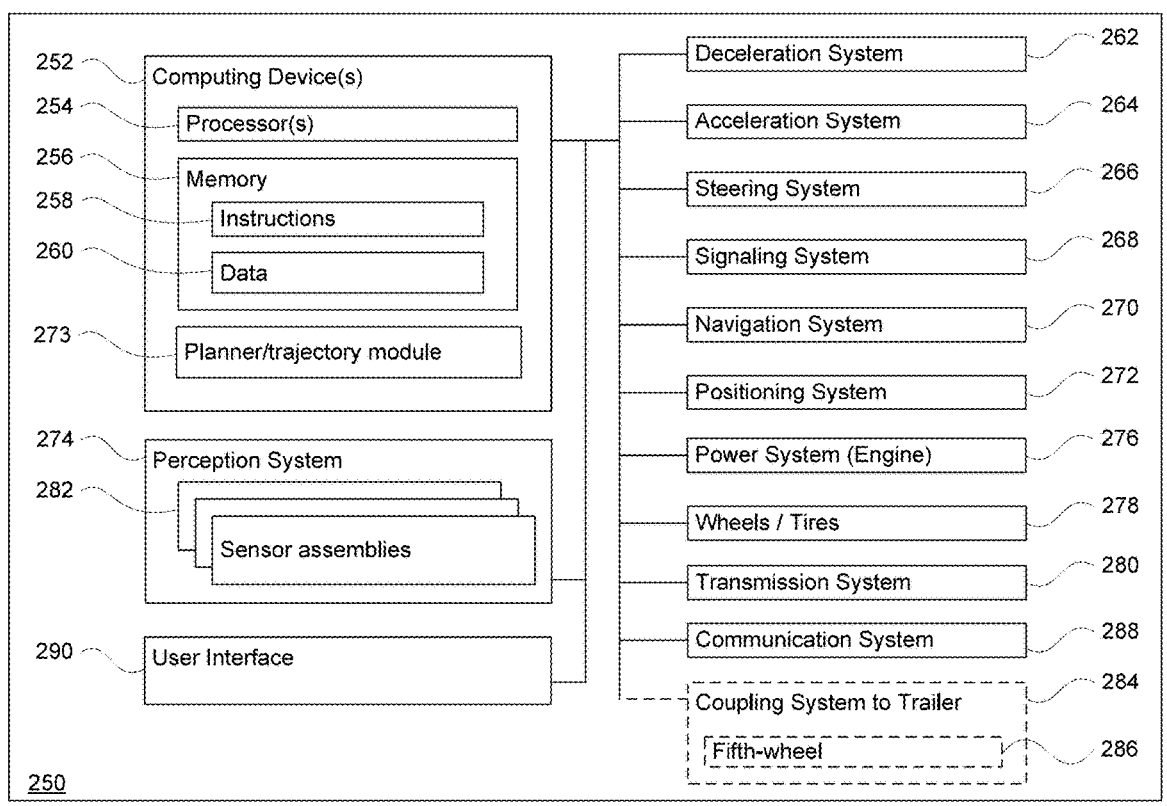

FIG. 2B illustrates a block diagram 250 with various components and systems of a vehicle, e.g., vehicle 140 of FIG. 1C. By way of example, the vehicle may be an articulated truck or other vehicle (e.g., a bus) configured to operate in one or more autonomous modes of operation. As shown in the block diagram 250, the vehicle includes a control system of one or more computing devices, such as computing devices 252 containing one or more processors 254, memory 256 and other components similar or equivalent to components 202, 204 and 206 discussed above with regard to FIG. 2A.

The control system may constitute an electronic control unit (ECU) of a tractor unit of a cargo vehicle. As with instructions 208, the instructions 258 may be any set of instructions to be executed directly (such as machine code) or indirectly (such as scripts) by the processor. Similarly, the data 260 may be retrieved, stored or modified by one or more processors 254 in accordance with the instructions 258.

In one example, the computing devices 252 may form an autonomous driving computing system incorporated into vehicle 140. Similar to the arrangement discussed above regarding FIG. 2A, the autonomous driving computing system of block diagram 250 may be capable of communicating with various components of the vehicle in order to perform route planning and driving operations. For example, the computing devices 252 may be in communication with various systems of the vehicle, such as a driving system including a deceleration system 262, acceleration system 264, steering system 266, signaling system 268 navigation system 270 and a positioning system 272, each of which may function as discussed above regarding FIG. 2A.

The computing devices 252 are also operatively coupled to a perception system 274, a power system 276 and a transmission system 280. Some or all of the wheels/tires 278 are coupled to the transmission system 280, and the computing devices 252 may be able to receive information about tire pressure, balance, rotation rate and other factors that may impact driving in an autonomous mode. As with computing devices 202, the computing devices 252 may control the direction and speed of the vehicle by controlling various components. By way of example, computing devices 252 may navigate the vehicle to a destination location completely autonomously using data from the map information and navigation system 270. Computing devices 252 may employ a planner/trajectory module 273, in conjunction with the positioning system 272, the perception system 274 and other subsystems to detect and respond to objects when needed to reach the location safely, similar to the manner described above for FIG. 2A.

Similar to perception system 224, the perception system 274 also includes one or more sensors or other components such as those described above for detecting objects external to the vehicle, objects or conditions internal to the vehicle, and/or operation of certain vehicle equipment such as the wheels and deceleration system 262. For instance, as indicated in FIG. 2B the perception system 274 includes one or more sensor assemblies 282. Each sensor assembly 282 includes one or more sensors. In one example, the sensor assemblies 282 may be arranged as sensor towers integrated into the side-view mirrors on the truck. Sensor assemblies 282 may also be positioned at different locations on the tractor unit or on the trailer, as noted above. The computing devices 252 may communicate with the sensor assemblies located on both the tractor unit and the trailer. Each assembly may have one or more types of sensors such as those described above.

Optionally shown in FIG. 2B in dashed lines is a coupling system 284 for connectivity between the tractor unit and the trailer, should the vehicle have that type of configuration. The coupling system 284 may include one or more power and/or pneumatic connections (not shown), and a fifth-wheel 286 at the tractor unit for connection to the kingpin at the trailer. A communication system 288, equivalent to communication system 242, is also shown as part of vehicle system 250.

Similar to FIG. 2A, in this example the cargo truck or other vehicle may also include a user interface subsystem 290. The user interface subsystem 290 may be located within the cabin of the vehicle and may be used by computing devices 252 to provide information to passengers within the vehicle, such as a truck driver who is capable of driving the truck in a manual driving mode.

Example Implementations

In view of the structures and configurations described above and illustrated in the figures, various aspects will now be described in accordance with aspects of the technology.

Figure 3A:
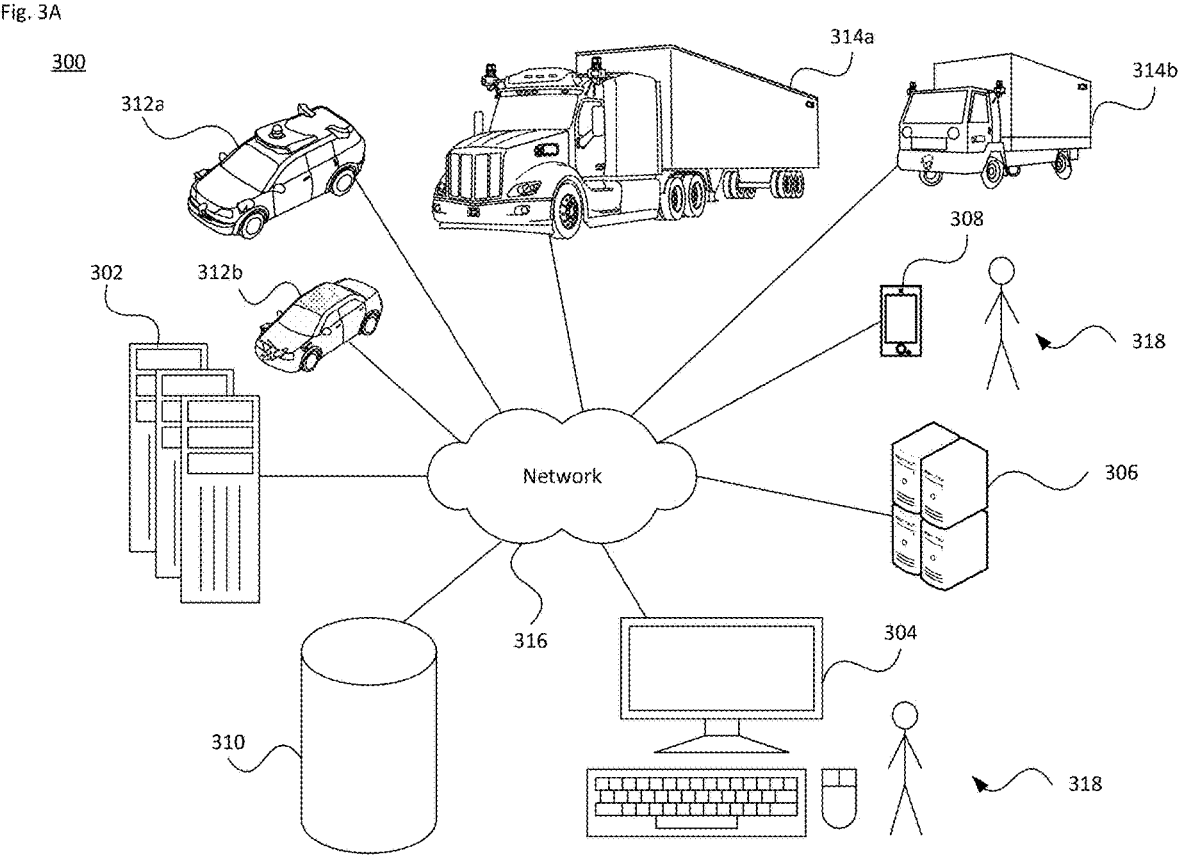
FIGS. 3A-B illustrates an example system in accordance with aspects of the technology.
Figure 3B:
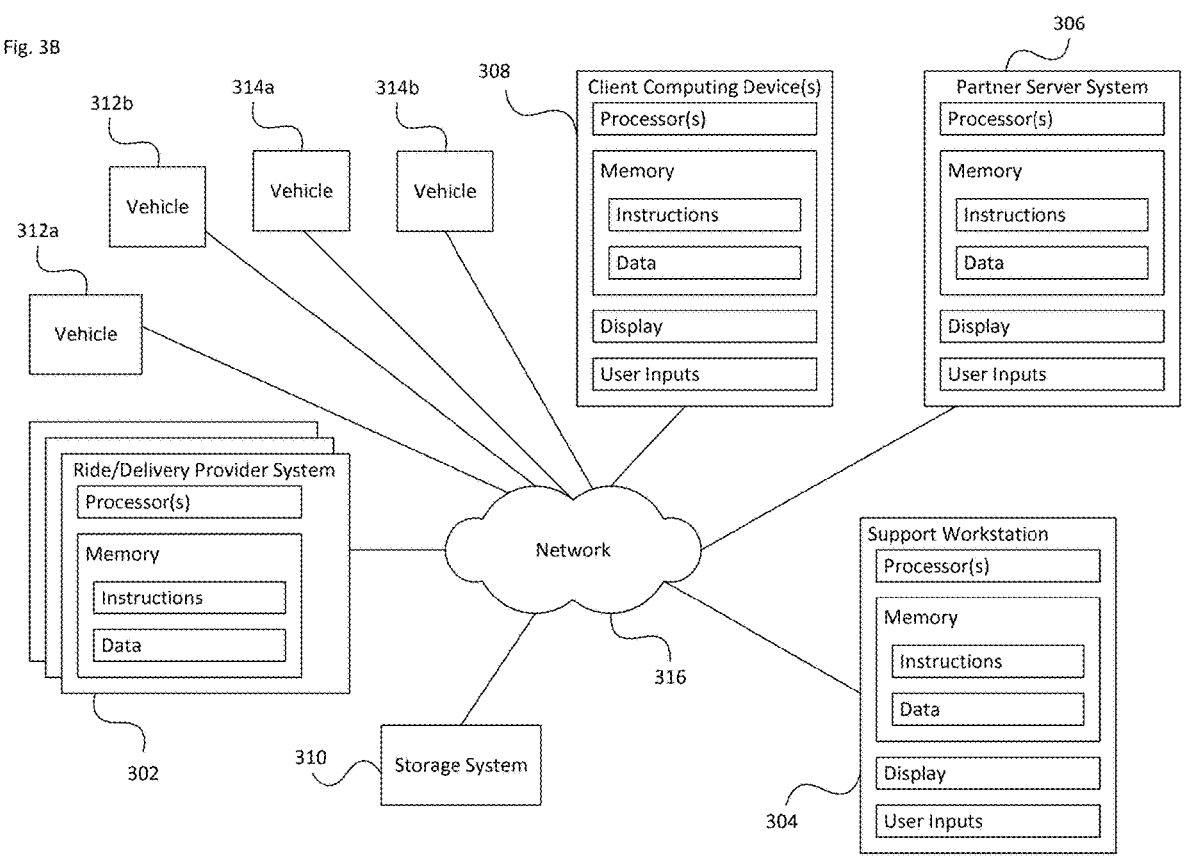

FIGS. 3A-B illustrate general examples of a system for coordinating between customers and autonomous vehicles, such as self-driving vehicles that are part of a fleet of vehicles capable of providing ridesharing and/or delivery services.

In particular, FIGS. 3A and 3B are pictorial and functional diagrams, respectively, of an example system 300 that includes a plurality of computing devices 302, 304, 306, 308 and a storage system 310 connected via a network 316. System 300 also includes vehicles 312 and 314, which may be configured the same as or similarly to any of vehicles 100, 120, 140 and/or 160 of FIGS. 1A-D, respectively. Vehicles 312a-b (e.g., passenger vehicles) and 314a-b (e.g., cargo/delivery vehicles) may be part of a fleet of autonomous vehicles, which may or may not operate with a driver assistance. Although only a few vehicles and computing devices are depicted for simplicity, a typical system may include significantly more.

As shown in FIG. 3B, each of computing devices 302, 304, 306 and 308 may include one or more processors, memory, data and instructions. Such processors, memories, data and instructions may be configured similarly to the ones described above with regard to FIG. 2. The various computing devices and vehicles may communication via one or more networks, such as network 316. The network 316, and intervening nodes, may include cellular connections, and the system may support short range communication protocols for vehicle to vehicle communication, such as Bluetooth™, Bluetooth™ low energy (LE), as well as various configurations and protocols associated with the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 302 may function as a ride provider system and/or a delivery system, and include one or more server computing devices having a plurality of computing devices, e.g., a load balanced server farm, that exchange information with different nodes of a network for the purpose of receiving, processing and transmitting the data to and from other computing devices. For instance, computing device 302 may include one or more server computing devices that are capable of communicating with the computing devices of vehicles 312 and 314, as well as computing devices 304, 306 and 308 via the network 316. For example, vehicles 312 and 314 may be a part of a fleet of vehicles that can be dispatched by the ride provider system and/or delivery system to various locations. In this regard, the computing device 302 may function as a dispatching server computing system which can be used to dispatch vehicles to different locations in order to pick up and drop off passengers or to pick up and deliver food, dry cleaning, packages or other cargo. In addition, server computing device 302 may use network 316 to transmit and present information to a user of one of the other computing devices or a passenger of a vehicle.

As shown in FIGS. 3A-B, each computing device 304, 306 and 308 may be a workstation, server system or personal computing device. By way of example, support workstation 304 and client computing device 308 may each be intended for use by a respective user 318, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The computing devices 304, 306 and/or 308 may also include a camera for recording video streams, speakers, a network interface device, and all of the components used for connecting these elements to one another. In this example, device 308 may be the device of a customer who is either currently in a vehicle 312 or 314, or may be the device of a customer awaiting pickup. In another example, device 308 may be device of a user who is overseeing logistics for package or other deliveries.

Although the client computing devices may each comprise a full-sized personal computing device, they may alternatively comprise mobile computing devices capable of wirelessly exchanging data with a server over a network such as the Internet. By way of example only, client computing devices 308 may be mobile phones or devices such as a wireless-enabled PDA, a tablet PC, a wearable computing device (e.g., a smartwatch), or a netbook that is capable of obtaining information via the Internet or other networks.

In some examples, computing device 304 may be a support workstation used by an administrator or operator to communicate with passengers of dispatched vehicles, users awaiting pickup, users handling package delivery logistics, etc. Although only a single support workstation 304 is shown in FIGS. 3A-B, any number of such workstations may be included in a given system. Moreover, although workstation 304 is depicted as a desktop-type computer, the workstation 304 may include various types of personal computing devices such as laptops, netbooks, tablet computers, etc.

Computing device 306 may be, as indicated in FIG. 3B, a partner server system. By way of example, the partner server system may be a computing system managed by a third-party ridesharing, ride-hailing or delivery service. Thus, according to one aspect the customers using client computing devices 304 may use an app to communicate with the partner server system instead of or in conjunction with communication to the ride provider or delivery system. Interaction between these various devices is discussed further below.

Storage system 310 can be of any type of computerized storage capable of storing information accessible by the server computing devices 302, such as a hard-drive, memory card, ROM, RAM, DVD, CD-ROM, flash drive and/or tape drive. In addition, storage system 310 may include a distributed storage system where data is stored on a plurality of different storage devices which may be physically located at the same or different geographic locations. Storage system 310 may be connected to the computing devices via the network 316 as shown in FIGS. 3A-B, and/or may be directly connected to or incorporated into any of the computing devices, such as the ride provider system 302.

In a situation where there are passengers, the vehicle or remote assistance may communicate directly or indirectly with the passengers' client computing device. Here, for example, information may be provided to the passengers regarding current driving operations, changes to the route in response to the situation, etc. Information may be passed from the vehicle to the passenger or other user via the vehicle's user interface subsystem (e.g., 234 of FIG. 2). For instance, when the user is awaiting pickup or a customer is awaiting a delivery, the vehicle may send pickup or delivery status information via network 316. However, when the vehicle arrives at the pickup or delivery location or the customer enters the vehicle, the vehicle may communicate directly with the person's device, e.g., via a Bluetooth™ or NFC communication link.

FIG. 4 illustrates an example arrangement 400 illustrating certain aspects of the system of FIGS. 3A-B. In this example, ride provider system 402 is capable of communicating with a fleet 420 of autonomous vehicles (see dashed lines 422), customers 430 (see elongated dash-dot line 432), and one or more partner server systems 440 (see solid line 442). For instance, the customers 430 may communicate directly with the ride provider system 402 via an app on the customer's mobile device. In this case, a rider trip API 404 may be employed by the ride provider system 402 for communication with and actions involving a given customer.

The customers 430 may also communicate directly with the partner server system 440 (see dash-dot line 434), e.g., using a different app. In this case, the partner server system(s) 440 is configured to coordinate with the ride provider system in order to provide the customer with an autonomous vehicle, or to provide a non-autonomous vehicle 442 driver by a human operator. When the partner server system 440 requests that an autonomous vehicle be deployed, a partner trip API 406 may be used by the ride provider system 402 for direct communication with the partner server system 440 and potentially for indirect communication with the customer 430.

As seen in FIG. 4, the ride provider system 402 may include a trip server module 408. This module may implement the rider trip API 404 and partner trip API 406. A trip database 410 may include one or more partner trip tables for information associated with trips arranged in conjunction with a partner server system 440, as well as one or more non-partner trip tables for information associated with trips arranged directly with customers. In one example, these tables may be distinct. In another example, the tables may be different records or fields in a common or shared database. Other configurations are also possible. The trip database 410 is in operative communication with the trip server module 408. The trip database is also in operative communication with a trip front end module 412 and/or a trip scheduler module 414.

By way of example only, the trip scheduler module 414 may coordinate with the autonomous vehicles of the fleet, while the trip front end module 412 coordinates communication with the trip server module 408. More particularly, the trip front end module 412 is configured to react to a user's (e.g., a customer's or partner's) requests, such as asking to initiate a new trip, or requesting information about the current trip (where the scheduler will find it, see below). In the former case, the trip front end module is configured to record a new trip request in the database. In the latter case, the trip front end module is configured to read the current status of the trip and send it back to the requester. The trip scheduler module is configured to decide which vehicle to assign to which trip, and communicates with the corresponding vehicles to make them serve the trip. The modules of the ride provider system 402 may be processes, routines or programs executed by one or more processors of the system 302. Alternatively, the modules may include the processors themselves (such as a set of CPUs or TPUs in a distributed processing system).

Figure 5A:
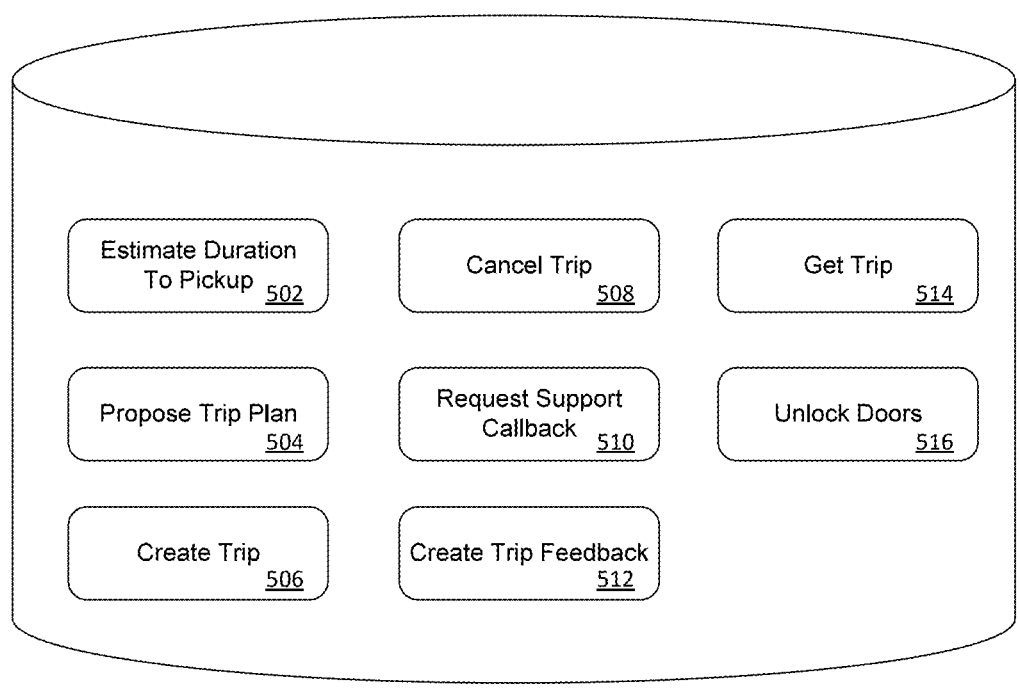

The ride provider system may employ one or both of the rider trip API and the partner trip API during operation. Examples of different API operations are illustrated in view 500 of FIG. 5A, and examples of query and response information are shown in view 520 of FIG. 5B. For instance, the API operations may include estimate duration to pickup 502, propose trip plan 504, create trip 506, cancel trip 508, request callback support 510, create trip feedback 512, get trip 514, and unlock doors 516. This set of API operations is not limiting, and other operations may be included or certain ones omitted, depending upon whether the partner trip API or the rider trip API is being employed.

Estimate duration to pickup 502 is a request for the ride provider system to give an estimate (to the customer or the partner server system) of how long it would take for an autonomous vehicle to get to a pickup point. This information can be provided accurately (e.g., within 2-5 minutes of the actual pickup), because the ride provider system decides which vehicle to dispatch to which customer. As indicated in block 522 of FIG. 5B, the query may include latitude and longitude for the pickup location. The response may be a time in minutes or seconds. Error details can be included in the response, such as no vehicles available, the pickup location is not within the service area, or some other reason why a duration to pickup cannot be estimated.

Propose trip plan 504 is an API for which the ride provider system returns an estimate of how long it would take for a selected autonomous vehicle to get to a pickup point. The propose trip plan 504 allows for negotiations regarding pickup and drop-off spots. Here, proposed waypoints may differ from what the customer originally requested, which can be due to the ability of the autonomous vehicle to reach a particular location, or other considerations that may lead to a more optimal trip. By way of example, if a given street is congested with traffic, is a one-way street, has limited access to a sidewalk, etc., the ride provider system may suggest an alternative pickup or drop-off point. In another example, the ride provider system may negotiate with businesses or municipalities, for instance asking them to mark certain pickup/drop-off spots as reserved for self-driving vehicles. As indicated in block 524 of FIG. 5B, the query for propose trip plan 504 may contain one or two waypoints (e.g., pickup point and drop-off location). If only one waypoint is included, it is assumed to be the pickup point. The response may describe a fare, time estimate(s) and other details for the proposed trip, which may form a trip proposal token.

Create trip 506 is an API call used to actually request a trip. This would follow an earlier propose trip plan. Here, a request for create trip should include a proposal token returned by the propose trip plan. The proposal token is time limited (e.g., within a 5-30 minute window, no longer than 60 minutes, etc.). The service provider (ride provider system) will be bound by the estimate returned in that earlier call. The create trip response includes a trip identifier, aka trip name such as "trips/ABqw93bx02". The trip identifier will be used in all subsequent requests dealing with that trip. As indicated in block 526 of FIG. 5B, the Create Trip call may include a trip proposal token obtained from the result of the propose trip plan 504. The response may include the details of a created trip (including a trip identifier), or an error indication. For instance, if the time limit has expired, a trip already exists for the customer, or some other issue arose, the response can include such information.

Cancel trip 508 is an API call that requests cancellation of a trip. The request contains the trip name (returned by an earlier call to the create trip 506), identifying the trip to cancel. Upon receiving a cancel trip request, the server (e.g., the trip server module of the ride provider system) will communicate with the assigned vehicle (if any) to inform it about the cancellation. In one example, if the vehicle is still on its way to the pickup, it may just abandon the trip immediately, for instance returning to a depot or other service center. However, if the cancellation occurs while the customer is in the vehicle, then vehicle will try to find a suitable spot to pull over and let the customer out. As indicated in block 528 of FIG. 5B, the input is a request for cancellation, which includes a resource name identifying the trip. However, because the request must be sent to the vehicle, and the vehicle may need to pull over to let the customer out, cancellation may not take effect immediately. Thus, the trip status may not update until this happens. An error message may be returned if no such trip exists, or if the trip exists but is no longer active.

Request callback support 510 involves an API call that requests that rider support (e.g., via remote assist workstation 304 of FIG. 3B) should contact the customer. The request should contain the trip name, returned by an earlier create trip query. The request 510 may also contain a phone number to call or other contact information (e.g., email address or social messaging handle). If no phone number or contact information is included, rider support can use the phone number included in or otherwise associated with the original propose trip plan request. As indicated in block 530 of FIG. 5B, the input includes the trip identifier, and may include contact information for the customer (e.g., their phone number). The result may be the customer being contacted by remote assistance. However, if this is not possible for some reason, the output may be an error message with a reason for the error. A phone number, website or other contact information may also be provided in the output so that the customer is able to obtain assistance.

Create trip feedback 512 enables a customer to provide feedback about the trip. This API request may contain the name or other identifier of the trip it talks about, a star rating (e.g., on a scale of 0-5 stars), and optionally a free-form text comment field. As indicated in block 532 of FIG. 5B, the input includes the trip identifier for the particular trip. The output may be a text string with the customer's feedback. If no such trip exists, the trip has not yet been completed or cancelled, or if feedback has already been provided, a message may be returned indicating this.

Get trip 514 is an API query that asks the server (e.g., the trip server module of the ride provider system) to respond with information about a given trip. This API request contains the trip name, returned by an earlier call to the create trip 506. The get trip response will contain information about the trip, such as its status (e.g., REQUESTED/ TO_PICKUP (e.g., en route or time until arrival at the pickup location)/AT_PICKUP (e.g., waiting at the pickup location, etc.), the license plate of the dispatched vehicle, and current location of the assigned vehicle (if any), driver information (if there is a driver in the vehicle), ETAs for future waypoints, and for completed trips, the location where the passenger was dropped off. Any or all of this information may be included in the get trip response. As indicated in block 534 of FIG. 5B, the input includes the trip identifier for the particular trip. The output may include trip status information, vehicle details and other information such as listed above.

Unlock doors 516 is an API query that requests the vehicle assigned to the trip to unlock its doors. This would be done once the vehicle has reached the pickup location and the user is ready to board the vehicle. Here, it would typically be up to the requester of this API to decide when the user is "ready to board". This could be the customer himself/herself, or the partner server system. The request will contain the trip name, returned by an earlier create trip response. As indicated in block 536 of FIG. 5B, the input includes the trip identifier for the particular trip. The result may be to unlock the doors. However, if this is not possible because the vehicle is not at the destination or pickup location, if no such trip exists, if the trip is no longer active, or if there is no vehicle assigned to the trip, the output may include an error message indicating this.

Various messages may be associated with these operations. Examples of such messages, for instance which may be passed from the ride provider system to the partner server system or the customer, are below.

The Trip Proposal message provides details about a trip that are likely to be satisfied, for instance as determined by the ride provider system. In one example, the Trip Proposal message would describe a full trip, with both pickup and drop-off waypoints. The information in the Trip Proposal message is valid for a selected timeframe, e.g., 1-5 minutes, or more or less. The Trip Proposal message may also include a proposed fare. Should a trip be created within the selected timeframe, then the proposed fare would be honored.

The Proposed Waypoint message indicates an incremental time that it would take for the autonomous vehicle to get to a proposed waypoint. Here, depending on the location of the pickup or drop-off waypoint, as well as the accessibility of that location to the customer, an additional buffer of time (e.g., 30 seconds to 2 minutes) may be added to the incremental time.

The Trip Plan message should include one or both of the pickup and drop-off location for desired trip.

The Trip message describes the trip. The trip may be scheduled to be taken, currently ongoing, or completed. The trip message contains information about the trip, such as its status (REQUESTED/TO_PICKUP/AT_PICKUP etc.), the license plate and current location of the assigned vehicle (if any), driver information (if present), ETAs for future waypoints, and for completed trips, the location where the passenger was dropped off.

The Trip Status message indicates a current status of the trip. For instance, a trip request may have been accepted by the ride provider system, and the trip may (i) be waiting to be assigned to a vehicle, (ii) have a vehicle assigned to the trip but the vehicle is currently engaged in another trip, (iii) have been accepted by the system but subsequently rejected by the vehicle, (iv) involve the vehicle being en route to the customer, (v) be at the point when the vehicle has already reached the pickup location, but is unable to remain idling at the location and so will move along and/or circle the block to return to the pickup location, (vi) be at the point when the vehicle is at the pickup point and waiting for the customer, (vii) at the point where the customer has not arrived at the pickup location within a determined amount of time (e.g., 3-7 minutes), (viii) in progress with the customer on board, (ix) at the drop-off point but the customer has not disembarked, (x) concluded, or (xi) cancelled).

The Waypoint message includes a location of a particular location, such as a pickup location, drop-off location, or interim stop. It may be, e.g., latitude and longitude coordinates, a location description such as a street address, or a place name such as the name of a store or business.

The Waypoint Status message provides an absolute time at which the vehicle is expected to arrive at a waypoint. Similar to the Trip Status message, the Waypoint Status message can include information about the trip, such as in situations (i)-(xi) described above regarding the trip status.

The Vehicle message may indicate the license plate or other identifying information about a vehicle selected for a particular trip.

The Driver message may be used when a driver is present in the autonomous vehicle. The Driver message may include information about the driver's name, an image of the driver, or the like.

The Route Segment message may include the most recent position of the vehicle, e.g., in latitude and longitude coordinates. It may also include pose or orientation information, such as the yaw of the vehicle. If an assigned vehicle is currently servicing another trip, the Route Segment message may include information about the route segment from the vehicle's current location to either the drop-off of the previous trip or the pickup point for the planned trip.

The Trip Feedback message may include feedback submitted after the completion of a trip. If a trip was cancelled, it may include information explaining the reason why it was cancelled. A customer may be provided with various options so that they may provide trip feedback.

The Partner User message may include a set of information (e.g., name and contact number) for unique association with a given trip. The contact number may be the customer's mobile phone number, to allow the ride provider system to contact the customer during the trip should the need arise.

The Phone Number message may be used with regard to the customer's phone number.

The Polyline message provides a chain of points on the map that approximates the vehicle's predicted route. The precision of the latitude and longitude for the chain of points may be determined based on an evaluation between accuracy and bandwidth available for communication of the message.

Example Scenarios

As noted above, the ride provider system may supply autonomous vehicles directly to customers who request a ride. The ride provider system may also support one or more partner services, in which a partner service is directly contacted by a customer, and the partner service then interfaces with the ride provider system in order to supply an autonomous vehicle to the customer. In the former case, a rider trip API may be used for communication and coordination between the customer and the ride provider service.

Figure 6:
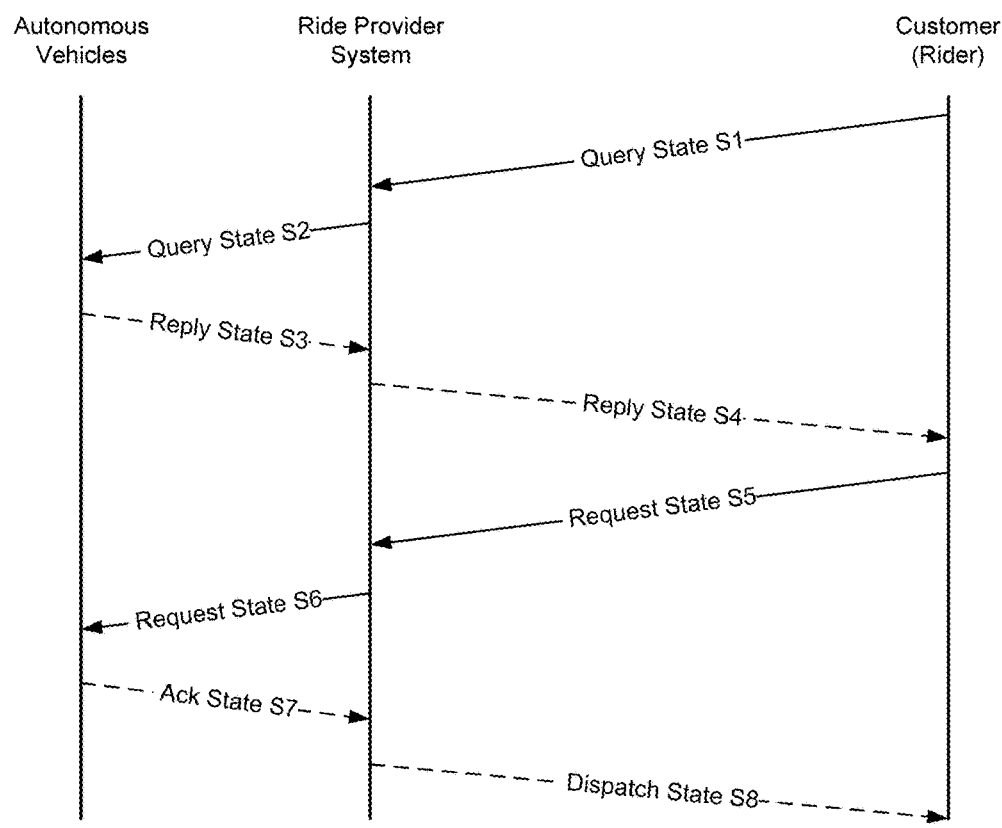
FIG. 6 illustrates an example timing diagram regarding customer and ride provider interaction in accordance with aspects of the technology.
Figure 7A:
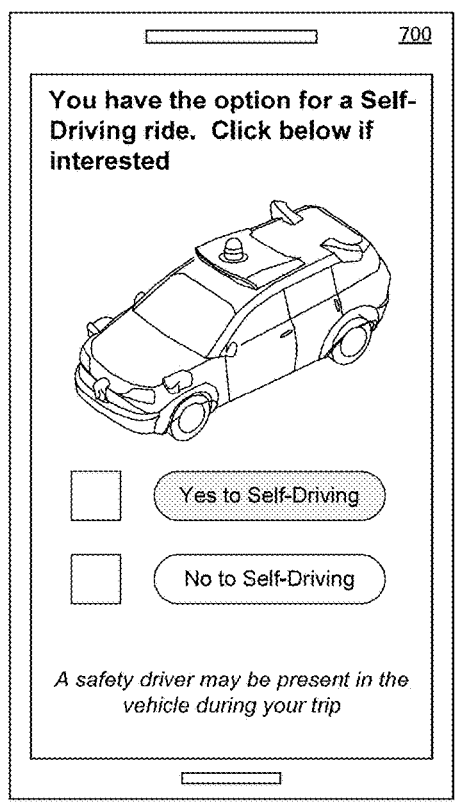
FIGS. 7A-C illustrate example screens of a client device user interface in accordance with aspects of the technology.

FIG. 6 illustrates an example timing diagram 600, which shows how a customer can request and be provided with an autonomous vehicle for a trip. For instance, in this example, as shown by Query State S1, the customer may use an app on his or her phone to request a ride. This can include triggering the propose trip plan 504. By way of example, as seen in view 700 of FIG. 7A, the app may show the customer that they are eligible to have a self-driving vehicle for their ride. Once they accept, he or she submits their request. The request includes a desired pickup location, and may include a destination and one or more stopping points, a pickup time, a destination arrival time, and other information. Also included with the request is an identifier that is associated with the customer, for instance an account number that is associated with a user account stored in a database of the ride provider system or another account database.

By way of example, some or all of this information may be maintained in a trip table. The trip table record for a given customer may be associated with certain information in the user account database, such as the customer's first and last name, contact number and ride preferences, as well as pickup and drop-off locations. In one case, the trip table would contain this information directly, e.g., during a time when a trip has been created and is ongoing. In other cases, the trip table would contain references to rows in other tables that contain the information. For example, the trip table may not contain the user's first/last name directly; rather, it could contain an identifier pointing at a row in a user table.

Returning to FIG. 6, once the ride provider system receives the query, it evaluates availability of one or more vehicles in the fleet. This may include determining whether the vehicles are in or out of service, currently on a trip, relative proximity to the pickup location, and other factors including the customer's preference(s). As part of this, it may issue queries to one or more vehicles, or check the vehicles' status in a database, at Query State S2. Responses may be received from the vehicles or database at Reply State S3. At this stage in the process, the ride provider system may directly or indirectly execute billing-related logic in order to estimate a fare. By way of example, the system may determine a fare based on vehicle availability, pickup location, destination, length of trip (in time or miles) and/or other criteria. In another example, the system may query a billing module (or separate billing system) to provide the estimate.

In Reply State S4 according to the propose trip plan API (e.g., including the Trip Plan message), the ride provider system may indicate the availability of one or more vehicles, as well as information regarding the pickup and drop-off locations (e.g., using the Trip message). For instance, as noted above, an autonomous vehicle may or may not be able to satisfy a request for a particular location for various reasons, including current or expected traffic conditions, road configuration, vehicle ingress or egress relative to the side of the road, wheelchair accessibility, customer preferences, etc.

Once the customer receives the reply per Reply State S4, he or she may accept or decline the response (e.g., via the create trip API or cancel trip API), or make further modifications to the trip request (e.g., another propose trip plan action). Thus, states S1-S4 may repeat one or more times. Then at Request State S5, the customer has accepted any modifications and client device communicates to the ride provider system to send a vehicle (e.g., via the create trip API). At this point, the ride provider system issues a request or other command to a selected vehicle at Request State S6, with the information necessary for the vehicle to conduct the trip. This can include the customer's name, nickname or other identifier, for instance so that the vehicle can greet the customer at pickup or otherwise communicate during the trip and/or arrival at the destination. The selected vehicle confirms acceptance of the ride via Ack State S7.

At this point the vehicle will either initiate the ride or will schedule the ride for a future time, for instance when it has completed a current trip with another customer, or based upon the desired pickup or drop-off time. At Dispatch State S8, the ride provider system communicates information about the trip initiation to the customer, e.g., in conjunction with the get trip API, using the Trip Status message, etc. As shown in view 720 of FIG. 7B, the app on the customer's device may indicate the current location of the vehicle relative to the pickup point, an estimated arrival time, and other trip-related information. And once the vehicle arrives, identifying information about the vehicle and/or pickup location may be provided on the app, as shown in view 740 of FIG. 7C.

As noted above, an alternative scenario occurs when the ride provider system supports one or more partner services. Here, a given partner service would be directly contacted by a customer, and the partner service interfaces with the ride provider system in order to supply an autonomous vehicle to the customer. In this case, a partner trip API may be used for communication and coordination between the customer, partner service, and the ride provider service.

Figure 7B:
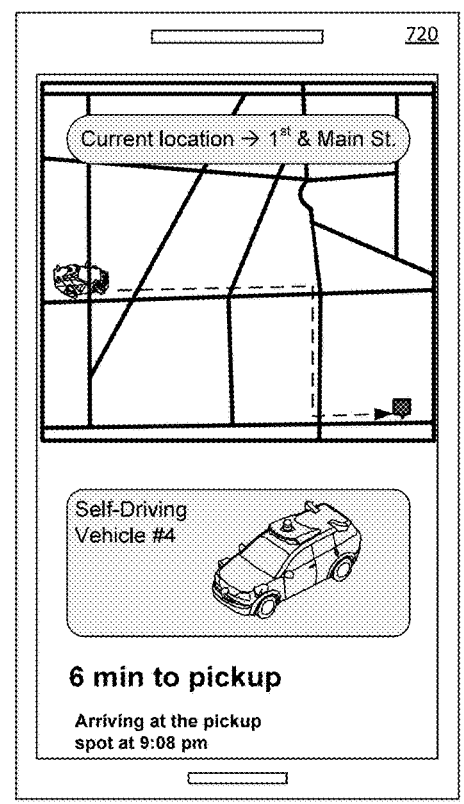
Figure 7C:
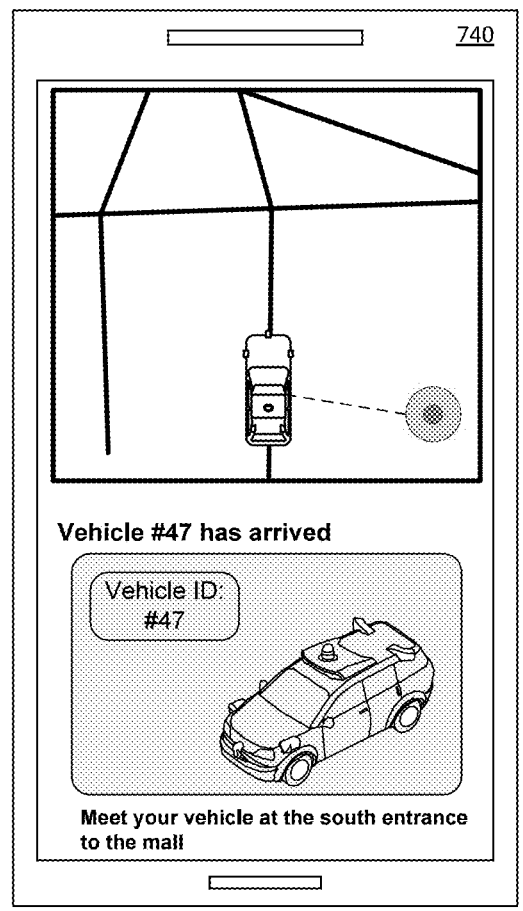
Figure 8:
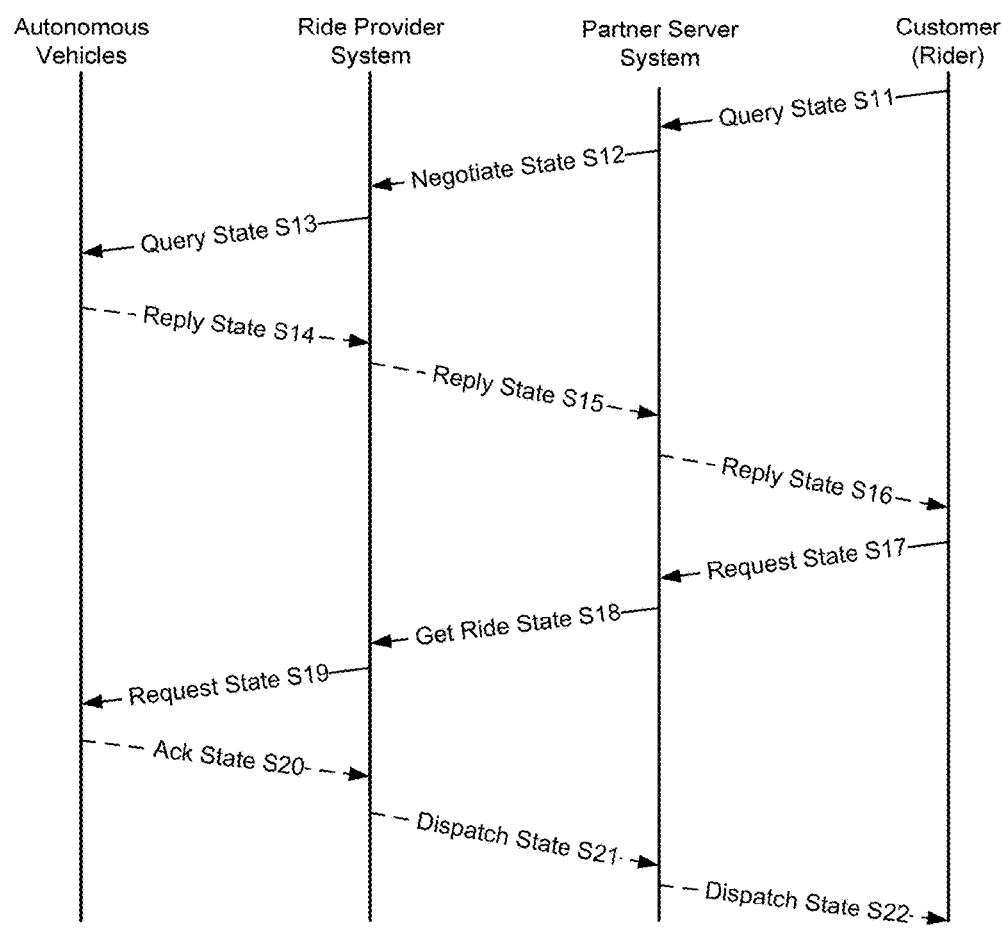
FIG. 8 illustrates an example timing diagram regarding customer, partner and ride provider interaction in accordance with aspects of the technology.

FIG. 8 illustrates an example timing diagram 800, which shows the overall approach for how a customer can request and be provided with an autonomous vehicle for a trip when there is a partner service involved. For instance, in this example, as shown by Query State S11, the customer may use an app on his or her phone to request a ride from the partner server system. The app may operate in the manner shown and discussed above regarding FIGS. 7A-C. In one scenario, the client-side app makes no distinction between vehicle provisioning directly with the ride provider system and vehicle provisioning when the partner service is involved.

When the partner server system receives the client request as part of the query state S11, the partner server system initiates a Negotiation State S12 with the ride provider system. This can include triggering the propose trip plan 504. Upon receipt of a request from the partner server system, the ride provider system evaluates availability of one or more vehicles in the fleet. This may include determining whether the vehicles are in or out of service, currently on a trip, relative proximity to the pickup location, and other factors including the customer's preference(s). As part of this, it may issue queries to one or more vehicles, or check the vehicles' status in a database, at Query State S13. Responses may be received from the vehicles or database at Reply State S14.

In Reply State S15 according to the propose trip plan API (e.g., including the Trip Plan message), the ride provider system may indicate to the partner server system the availability of one or more vehicles, as well as information regarding the pickup and drop-off locations (e.g., using the Trip message). For instance, as noted above, an autonomous vehicle may or may not be able to satisfy a request for a particular location for various reasons, including current or expected traffic conditions, road configuration, vehicle ingress or egress relative to the side of the road, wheelchair accessibility, customer preferences, etc. The partner server system may evaluate this information, for instance in view of what non-autonomous vehicles it could provide to the customer. At Reply State S16, the partner server system provides the customer with one or more trip options.

Once the customer receives the reply per Reply State S16, he or she may accept or decline the response (e.g., via the create trip API or cancel trip API), or make further modifications to the trip request in the manner described above for a customer-ride provider system interaction (e.g., another propose trip plan action). Thus, states S11-S16 may repeat one or more times. Then at Request State S17, the customer has accepted any modifications and client device communicates to the partner server system to send a vehicle (e.g., via the create trip API). Here, if the request can be serviced by an autonomous vehicle, the partner server system enters the Get Ride State S18, in which it requests that the ride provider system dispatch an autonomous vehicle for the customer's trip. Alternatively, if the request is to be serviced by a manually-driven vehicle, then the partner server system may perform vehicle selection and dispatch without further communication with the ride provider system.

When the ride provider system receives the dispatch request from the partner server system at the Get Ride State S18, the ride provider system issues a request or other command to a selected vehicle at Request State S19, with the information necessary for the vehicle to conduct the trip. This can include the customer's name, nickname or other identifier, for instance so that the vehicle can greet the customer at pickup or otherwise communicate during the trip and/or arrival at the destination. The selected vehicle confirms acceptance of the ride via Ack State S20. At this point the vehicle will either initiate the ride or will schedule the ride for a future time, for instance when it has completed a current trip with another customer, or based upon the desired pickup or drop-off time. At Dispatch State S21, the ride provider system communicates information about the trip initiation to the partner server system, e.g., in conjunction with the get trip API, using the Trip Status message, etc. Information about the trip is then provided by the partner server system to the customer in Dispatch State S22.

While not shown in FIGS. 6 and 8, as noted above the customer is able to provide feedback about the trip (either during or after) via the create trip feedback API, e.g., including the Trip Feedback message. The Partner User message and/or the Phone Number message may be employed when contacting the customer. The other messages described above may be incorporated into one or more of the API processes, for instance to communicate identifying information about the vehicle or driver (if present), the route, and other aspects of the trip.

Although the overall process flow for the rider trip API (FIG. 6) and the overall process flow for the partner trip API (FIG. 8) are similar, there are aspects of the ride provider and partner interactions that can provide more robust information to the partner server system that the partner server system may normally have. For instance, API operations estimate duration to pickup 502 and propose trip plan 504 may be implemented as API calls by the partner server system to the ride provider system, where the ride provider system returns an estimate of how long it would take for a vehicle to get to a pickup point. And as noted above, propose trip plan 504 may enable negotiation of pickup and drop-off points that differ from what the partner server system requests. These API calls may be made with or without an actual customer request. In particular, the partner server system may issue such calls in Negotiate State S12, even though there is no incoming customer request. This may be done so that the partner server system knows in real time or near real time (e.g., the information is no more than 5-10 minutes old) whether an autonomous vehicle can service a pickup at a given location at a particular time. This could be done in anticipation of a service need, such as during rush hour or before or after a show, concert or sporting event.

One distinction between the rider trip API and the partner trip API is that in the former case, the customer has or sets up an account with the ride provider system. In this case, the trip database of the ride provider system may maintain trip tables regarding service requests from actual customers. In contrast, when interactions with customers are done via the partner server system, there may be no account set up by an actual customer with the ride provider system. In this scenario, the ride provider system may create a set of non-customer accounts, or may alternatively support partner users directly without utilizing non-customer accounts.

For instance, a set of non-customer accounts may be set up and curated by the ride provider system, for instance with the trip server module using such information to manage one or more partner trip tables in the trip database. In one example, non-customer accounts are not associated with a real customer and include information entirely maintained within the ride provider system. As such, these accounts are automatically authenticated. The non-customer accounts may be created as needed, or a set may be created and maintained for a specific period of time or for an indeterminate timeframe.

According to one scenario, a particular non-customer account may be associated with one partner organization (e.g., a third party ridesharing or ride-hailing company), an account number, and lease information. The account number may be a unique reference to the particular non-customer account. The lease information may be used to indicate whether the non-customer account is actively associated with a current or planned trip. More generally, the lease information indicates whether a given non-customer account has been temporarily associated with a specific, real end user (who is identified by, e.g., first/last name and their phone number). This can include an indicator for how long the lease is valid until. Throughout the trip creation flow described above, a single non-customer account is used to act on behalf of the currently active real end user.

The non-customer accounts are used to request and manage trips on behalf of the partner organization. The ride provider system may evaluate one or more non-customer accounts of the set of accounts to determine whether that account is or is not actively associated with a trip. This may be done by issuing a "Get Active Trip" remote procedure call to the one or more accounts, which can return "true" (yes, actively associated with a trip) or "false" (no, not actively associated with a trip).

If one account is actively associated with a trip, then the system looks for another account that is not actively associated with a trip. Once a given account is identified that is not actively associated with a trip, the system "leases" the account for purposes of a new trip. A lease ties the non-customer account to a partner organization until some time T, or until a trip is created. By tying the account to the partner organization, the ride provider system can manage API requests from the partner even when there is no actual customer requesting a ride. In one example, time T may be, e.g., 30 seconds, 5 or 10 minutes, no more than 30 minutes, etc. If a given account is leased, then it is considered "locked" for use with the partner organization until time T is reached or some other criteria is met. During this phase, should a trip be booked with a customer via the partner server system, the leased non-use account is associated with the trip in the trip database, for instance in a non-partner trip table.

Customers that directly arrange for a ride with the ride provider system (e.g., using the rider trip API) have accounts associated with them. Such accounts would typically be associated with billing records, and a billing system that may or may not be part of the ride provider system would handle billing for trips provided by the ride provider system's autonomous vehicles. In contrast, when the customer arranges for a ride via a partner service, as noted above a non-customer account is used by the ride provider system. In this case, the ride provider system and third party partner service may arrange for a fee to provide the customer with the trip, and the partner service may bill the customer according to its own billing system separate from the rider provide system's. By way of example, the partner service may be responsible for direct billing of their riders, while the ride provider system invoices the partner separately. Alternative approaches may also be used. For instance, the ride provider system could directly bill the riders, even though they would be customers of the partner service. This may involve secure sharing of payment information between the partner company and the ride provider system.

In the situation where a customer has arranged for a ride using an autonomous vehicle via a partner service (e.g., using the partner trip API), even though a non-customer account is used within the ride provider system to handle the trip, certain information about the customer may be provided to the ride provider system from the partner server system. In particular, at least the customer's contact information (e.g., mobile phone number and/or email address) may be provided. The customer's preferences and name may also be provided. This information may be associated with the trip record for the duration of the trip. By way of example, once the customer has entered the vehicle and before arriving at the destination, the ride provider system may be able to communicate with the customer. This might be done directly, or indirectly via the partner server system. In one scenario, the partner trip API would enable the customer to communicate with remote assistance personnel of the ride providers via a request callback support message, and allow the customer to provide feedback about the ride via a create trip feedback message. In addition to features available to the customer via the trip API, the customer within the vehicle would also be able to open doors (when stopped), roll down the windows, adjust the music volume, press a "Go" button in the vehicle (either a physical button or on-screen icon) when they are ready to start the ride, etc.

As noted above, the technology is applicable for various types of vehicles capable of transporting passengers, including sedans, minivans, buses, RVs, motorcycles and the like. It may also be applicable to package transport and delivery using cargo trucks, delivery vans, and the like. By way of example, the API may also be employed with delivery partners (e.g., food, package and/or bulk cargo delivery), for concierge services (e.g., a hotel or medical provider, or e-commerce specialist who coordinates deliveries) and the like.

For instance, the messages and communication flows of the API provide the ability to indicate requirements on the vehicle, e.g., ability to carry groceries or prepared foods, prescriptions, parcels or larger cargo of a certain size/weight. However, this information need not be conveyed in the API itself. Thus, if a given partner only handles parcel deliveries, then this type of information could be part of that partner's account configuration. Regardless, the system would determine whether a vehicle from the ride provider's ride hailing fleet could be used for the trip or whether a cargo-specific autonomous vehicle would need to be sent. The API may also provide the ability to indicate size and weight of parcels or cargo to be delivered. This could allow the autonomous ride provider to automatically handle multiple delivery trips to be serviced with the same vehicle, such as until the vehicle has been "filled". The information could also be used for billing purposes, such as based on package weight, size, type (e.g., perishable foods, fresh-cut flowers, previous materials such as jewelry, etc.)

Another aspect of the API that can be employed in any of the scenarios discussed herein is the ability to specify multiple stops. For example, a partner that wants to pick up packages from a warehouse and drop them at multiple locations, or a partner that wants to pick up from multiple locations and bring them to a central depot, can use the API including the Waypoint message or Waypoint status message to identify one or more interim stops, as well as when the vehicle is expected to arrive at those stops.

Yet another aspect that is applicable to delivery-type services is the ability to attach information to the request, such as a "packing slip" or other description of what is being sent. This information may not be utilized by the ride provider system, but would be stored just for the convenience of the API user or the recipient of a package.

A further aspect of the technology is the ability to schedule a trip ahead of time, possibly on a recurring basis. For example, for a partner that always wants packages to be picked up at a certain time of day can arrange this ahead of time. This might be a convenience for the partner, but it would allow the ride provider system to schedule vehicles differently, e.g., on an hourly, daily, or weekly basis.

Figure 9:
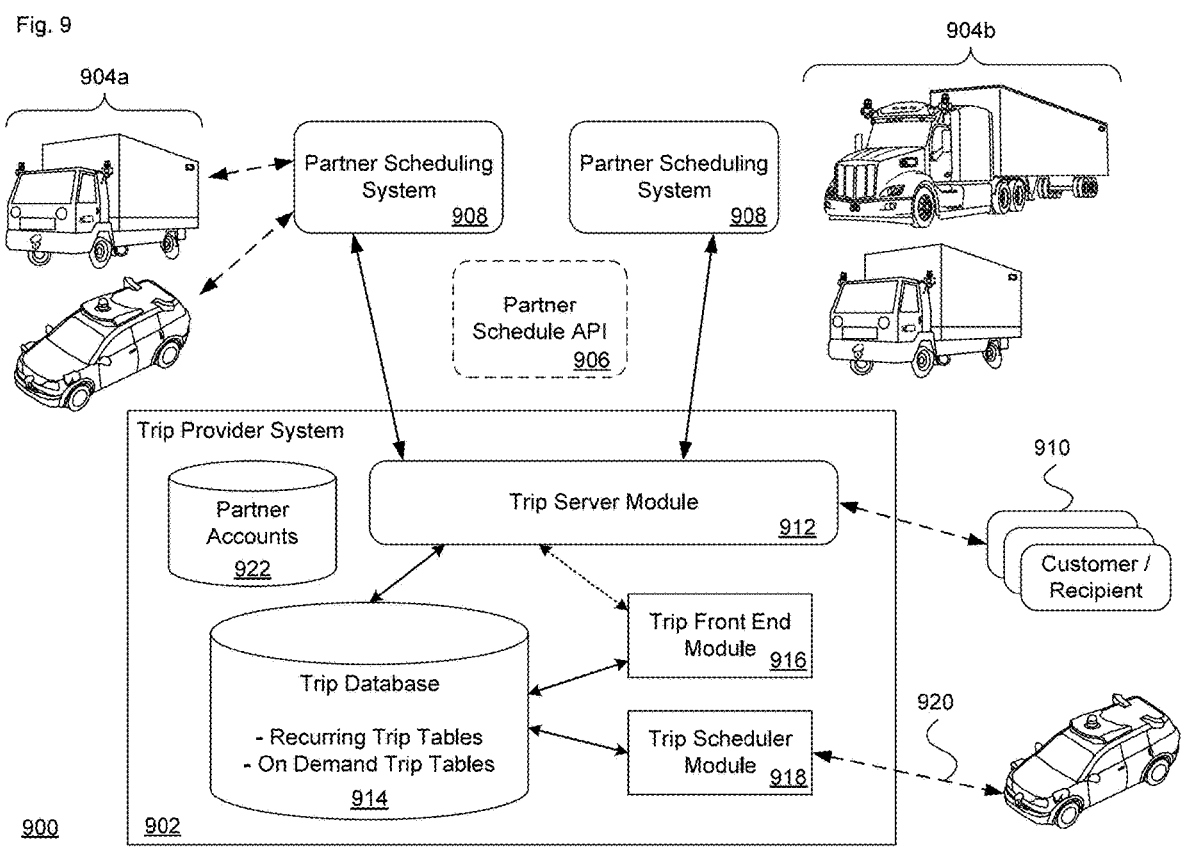
FIG. 9 illustrates an exemplary arrangement in accordance with aspects of the technology.

A partner entity (e.g., a delivery company, a parts supply store, a concierge service, etc.) may schedule a single trip or regular trips via a partner schedule API. For instance, FIG. 9 illustrates an example arrangement 900, which can operate similarly to the arrangement 400 of FIG. 4. In this example, trip provider system 902 is capable of communicating with a fleet 904 of autonomous vehicles such as a first subset of vehicles 904a and a second subset of vehicles 904b. Here, one or more vehicles in either subset may be dedicated to a particular partner, such as to support regular (e.g., daily) deliveries. Alternatively, one or more vehicles of the fleet may not be dedicated to a particular partner, but may be configured to as delivery vehicles. For instance, in subset 904a, a passenger vehicle may be configured for food or package deliveries, which may include specific branding information presented along the vehicle, and/or tinting or coverings on the windows so that what is being delivered is not readily visible to those outside the vehicle.

As shown in this example, partner schedule API 906 supports the trip requests from one or more partner scheduling systems 908 and the trip provider system 902. For instance, an agent of a given partner may interface with the trip provider system 902 via a web browser or other app, which may be part of the partner's scheduling system 908. The partner scheduling system(s) 908 is configured to coordinate with the trip provider system 902 in order to provide one or more autonomous vehicles of the fleet 904, which may be owned or otherwise managed by an entity associated with the trip provider system. Thus, when the partner scheduling system 908 requests that an autonomous vehicle be deployed, e.g., for a delivery or as part of a concierge ride service, the partner schedule API 906 may be used by the trip provider system 902 for direct communication with the partner scheduling system 908 and potentially for communication with a customer of the service or a recipient of the delivery, as shown by block(s) 910.

As seen in FIG. 9, similar to FIG. 4 the trip provider system 902 may include a trip server module 912. This module may implement the partner schedule API 906. A trip database 914 may include one or more partner trip tables for information associated with trips arranged in conjunction with one or more partner scheduling systems 908. This can include recurring trip tables for trips that are scheduled to recur, and on demand trip tables for other trips requested on an as-needed basis. In one example, these tables may be distinct. In another example, the tables may be different records or fields in a common or shared database. Other configurations are also possible.

Each partner scheduling system 908 is able to access information from the trip database 914 via the partner schedule API for rides associated with that particular partner. Here, one or more agents of the partner may have access to the information. In one example, each agent may have the ability to schedule any pickups or deliveries on behalf of that partner. In another example, an agent may be authorized to schedule pickups or deliveries to or from a particular location such as a particular store that is one of multiple stores owned or operated by the partner (e.g., a parts supply store, a pet food store, a local branch of a restaurant chain, etc.), or within a particular geographic area. Here, that agent may only have the ability to see trip-related information for that location or service area. In contrast, another agent at the partner's corporate headquarters may have the ability to access trip-related information associated with all of the partner's locations. In another example, the trip provider system 902 may present a schedule for or availability of one or more autonomous vehicles to the agent(s) via the partner schedule API 906. According to another scenario, an authorized user of the trip provider system may be able to manage trips associated with multiple partners. For instance, a concierge service may be authorized to set up trips for clients of different hotel chains.

As shown, the trip database 914 is in operative communication with the trip server module 912. The trip database is also in operative communication with a trip front end module 916 and/or a trip scheduler module 918. By way of example only, the trip scheduler module 918 may coordinate with the autonomous vehicles, while the trip front end module 916 coordinates communication with the trip server module 912. More particularly, the trip front end module 916 may be configured to react to a user's requests (e.g., an agent of a partner), such as asking to initiate a new trip on demand or recurring trip, or requesting information about the current trip. In the former case, the trip front end module is configured to record a new trip request in the database. In the latter case, the trip front end module is configured to read the current status of the trip and send it back to the requester via the partner schedule API. The trip scheduler module is configured to decide which vehicle to assign to which trip, and communicates with the corresponding vehicles to coordinate serving the trip as shown by arrow 920. The modules of the trip provider system 902 may be processes, routines or programs executed by one or more processors of the system 302. Alternatively, the modules may include the processors themselves (such as a set of CPUs or TPUs in a distributed processing system).

According to one aspect of the technology, the trip provider system illustrated in FIG. 9 (or the ride provider system illustrated in FIG. 4) provides a back-end system to support a dispatch tool (e.g., via a web browser) that lets multiple users collectively manage and view multiple trips for one or more partner entities. This system supports scheduling recurring trips as well as one-time trips. A partner accounts database 922 may be part of or separate from the trip provider system 902. In one example, each account includes an identifier that is associated with a respective partner, such as an account number.

Similar to the approach explained above, a set of non-customer accounts may be set up and curated by the trip provider system, for instance with the trip server module using such information to manage the partner trip table(s) in the trip database. Each partner account may include one or more user or agent sub-accounts or an identifier associated with each person that is able to create and manage trips/schedules for the respective partner. Billing may be configured per partner for all of its users. In accordance with the permissions for each user, the system may allow users to: (i) list recurring schedules that auto-create trips, (ii) create unscheduled trips or other trips that do not follow a recurring schedule, (iii) list ongoing, past and scheduled trips, (iv) cancel trips, (v) create/delete schedules, (vi) have a list of pre-set locations at which the user can manage trips, and (vii) see a map of ongoing trips. Each of these may be provided in a user interface of a web-based app or other program. In some examples, the pre-set locations would be modified, or the user may be able to specify a location (e.g., by typing in an address or dropping a push-pin on an electronic map in a trip user interface app).

Figure 10:
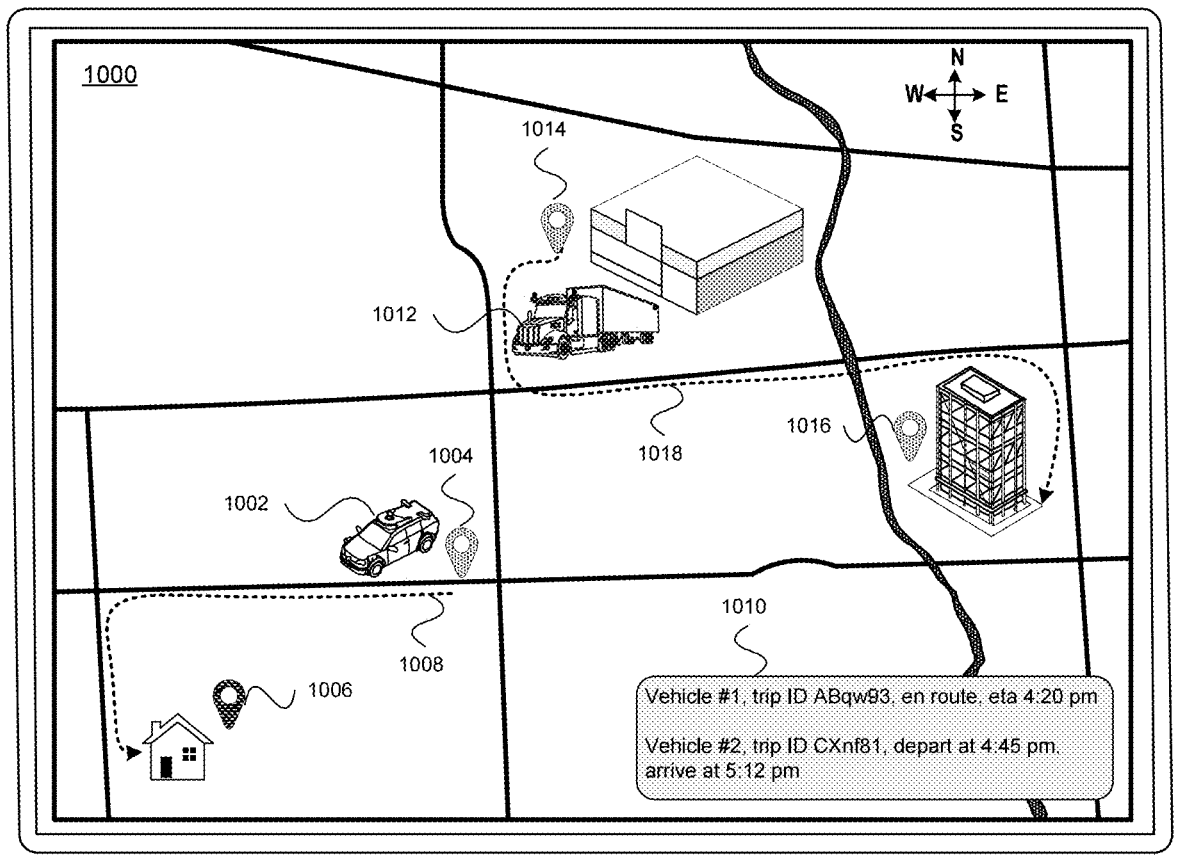
FIG. 10 illustrated a map-focused user interface in accordance with aspects of the technology.

FIG. 10 illustrates a trip map 1000 displayed in a user interface of an app. The map may indicate a current trip for a first vehicle 1002 (e.g., "Vehicle #1"), which is en route from a current position 1004 to a destination 1006 such as a house. This information can be generated by the trip provider system and transmitted to the customer or recipient. As shown, the first vehicle 1002 is traveling along a planned route 1008, for instance to deliver groceries or a meal, or to pick up a passenger. As shown in the user interface box 1010, information about this vehicle, including its trip ID, current status ("en route") and estimated time of arrival may be presented to the partner's agent. The map also indicates a scheduled trip for a second vehicle 1012. Here, the second vehicle may be scheduled to depart from a warehouse 1014 and travel to an office or store 1016 via route 1018. Here, the user interface box 1010 also indicates the vehicle ("Vehicle #2"), it's trip ID, current status ("depart at 4:45 pm") and estimated time of arrival ("arrive at 5:12 pm"). The agent may be able to view additional details of each trip, such as the type of vehicle, what is being delivered, where the vehicle will go after this trip, etc. And as noted above, the agent may be authorized to modify the planned trip, for instance to make it a recurring trip.

A pool of trip-specific "accounts" can be made available for each partner. These accounts can be used by the system to enable agents of the partners to arrange multiple trips. In one example, to allow an agent to create trips, a usage identifier is created (e.g., a random identifier string). When making a request for a particular trip (via the partner schedule API) the usage identifier would be incorporated into the request. Each request would have its own (unique) usage identifier. Alternatively, instead of a pool of accounts, the system may associate any created trips only with the partner's account.

With regard to a list ongoing, past and/or scheduled trips for a given partner, the system may maintain the following information for each trip: a trip identifier, a timestamp of when the trip was created, a timestamp for the scheduled start of the trip, the current trip status (including if it was cancelled), vehicle license plate, pickup and drop-off locations (and any intermediate stops), and a schedule identifier that can be associated with the trip's target pickup time, trip proposal token, and/or requesting partner if applicable.

Each partner entity, or each agent of a partner, can set one or more recurring schedules. Initiating a recurring schedule can include a time spec that describes which days in the week, time, and time zone that the scheduled trips should be created to arrive at the pickup location, and an API proto, which describes the pickup and drop-off locations, pickup/drop-off notification settings, and could include service preferences like door unlocking, pickup verification, vehicle/cargo types required to service the trip. The proto may include other details regarding recurrences (including exceptions), time zones, daylight savings changes, etc.

In one scenario, the trip provider system may run a repeating job (e.g., daily, hourly, etc.) that reads from all schedules from the different partners, creates scheduled trips for the next amount of time (e.g., the next 24 hours, next 90 minutes, etc.), and puts them into a trip queue. In this case, whenever a recurring schedule is created or updated, the trip queue will be updated. For instance, all of the schedule's previously scheduled trips for times that have passed will be removed from the queue, while any new trips for the next amount of time will be inserted into the queue. Here, on-demand (one time) scheduling can be supported by directly creating a scheduled trip and adding it to the trip queue.

The trip provider system may be configured to create trips to arrive at a drop-off or pickup location at or before the scheduled time. This planned arrival time may be affected by factors such as poor weather conditions, traffic, construction, etc. As noted above, the trip scheduler module is configured to decide which vehicle to assign to which trip, and communicates with the corresponding vehicles to make them serve the trip. Here, the system may cause the trip scheduler module to arrange for a given vehicle to handle the trip according to a buffer window (e.g., anywhere from 1-10 minutes), so that the vehicle arrives at the selected location by the planned arrival time. The system may start sending a propose trip plan request some amount of time before a scheduled departure time (e.g., 2-10 minutes beforehand), and create the trip when the vehicle is likely to arrive at the pickup location at the target time. For vehicles that are in between trips or are not at a dispatch depot, they may be configured to loiter or remain within some threshold distance (or time) of one or more pickup/drop-off locations. Alternatively, the system may ensure that one vehicle in a fleet is available to service a trip, where the trip scheduler module is able to instruct that vehicle about the trip so that the planned arrival time is met.

One or more logistics optimization algorithms can be applied that consider the fleet holistically. In addition, the fleet can be optimized without particular consideration for optimizing criteria associated with a human driver (e.g., without regard to how long the vehicle has been operating because there is no need for a driver to take a break due to fatigue or any time of driving requirement) when operating in a fully autonomous mode. Furthermore, when optimizing, it may become apparent that multiple deliveries could be coalesced into a single pickup. For example, it may be feasible to do one pickup of five orders from a supermarket, pharmacy or other store, and then deliver them to the respective customers. It might even be optimal to delay the pickup to allow more orders to be prepared, and then plan a single route to deliver the five items. The logistics optimization algorithm(s) may consider one or more variables including: the type(s) of goods, any special handling requirements (e.g., frozen foods must be kept below a certain temperature or a meal should be delivered while still warm), whether customers requested particular delivery times or drop-off locations, whether multiple orders to different customers could be delivered to a common location (e.g., front door of an apartment building), etc.

For rider pickups, as noted with regard to FIGS. 7B-C, the person awaiting pickup can be notified as to the vehicle's status and its arrival via an app on their device (e.g., mobile phone, smartwatch, etc. For deliveries to a store or other business, notifications may be provided to the business owner or an employee. Here, the notification may be provided to a client device such as a computer or mobile phone. By way of example, upon reaching the dispatch state (see S8 of FIG. 6), the trip server module may communicate with the recipient of a delivery, including information about initiation of the trip and expected arrival time. As the vehicle arrives at the destination, a notification can be provided via, e.g., text message, email or an automated phone call to a phone number associated with the partner or a customer.

The trip provider system can be particularly beneficial to various types of partner entities. As noted above, some use cases include delivery companies, parts supply stores, a concierge service or e-commerce specialist that coordinates rides or deliveries, food-related deliveries, dry cleaners, drug stores and the like. Depending on the provider and where items are to be delivered, it can be helpful to identify how far a customer might have to walk to/from the vehicle (e.g., to pick up their groceries), how heavy or bulky a package is, or how convenient a pickup or drop-off location is. For instance, the system can enable an agent to make adjustments to the pickup location by modifying a recurring trip record. Here, the system may aid the process by assessing the walking difficulty (e.g., how many minutes will it take, or whether the person will have to cross a busy street) or the likelihood that the vehicle can pull over at a convenient location (e.g., a delivery or drop-off zone adjacent to the store). In one scenario the system may assess the difficulty and simply reject trips that require too much walking (e.g., longer than a certain distance such as 100 meters, or longer than a certain amount of time such as 2 minutes). In another scenario, the system may enable the user to make adjustments. In a further scenario, the vehicle may be tasked with a new location upon arrival once it becomes apparent what the current traffic, available parking, and other real-time environmental factors appear to be. From an API standpoint, this could include providing live updates to the user of how/why the vehicle has decided to adjust its stopping location. In yet another scenario, there may be a person in the vehicle such as to provide support for a concierge trip. In this case, the person may be able to assist with a delivery or to propose a better drop-off location (or select from multiple options proposed by the vehicle). Here, the person could make the proposal or selection via the in-vehicle user interface (e.g., user inputs 236 of FIG. 2A) or via a trip API via an app on their own computing device.

As noted above, there may be communication between the ride or trip provider system and a user of the service. Such communication may involve a rider waiting to be picked up, a person awaiting delivery, a store or warehouse employee who will load the vehicle for a delivery, etc. Here, in addition to being able to track the progress of the vehicle including its expected arrival time, the API (e.g., the API 404 of FIG. 4 or the API 906 of FIG. 9) may also support user interactions with the vehicle. These may be indirect interactions via the trip server module or direct interactions, e.g., via cellular or near-field communication. By way of example, the system may send a request to the vehicle unlock a door so that the person can enter for a trip, or unlock a door, the trunk or other storage location so that the person can retrieve a delivery (e.g., a meal, groceries, a package, etc.).

For instance, as shown in scenario 1100 of FIG. 11, a delivery vehicle 1102 may be configured to pick up deliveries from one or more stores. In this example, the vehicle 1102 may approach a row of stores, which include a restaurant 1104 (House of Pizza), a post office 1106, and a pharmacy 1106. Here, partner entities may include the restaurant 1104 and the pharmacy 1108, which may each separately interface with the trip provider system via a partner schedule API (e.g., 906 in FIG. 9). As the vehicle is approaching the stores, it may identify a pullover location depending on various factors, such as the pickup time for each store, whether there is a pickup zone or a no-parking zone (e.g., no-parking zone 1110), etc. The system may automatically remotely unlock the vehicle's door(s) at pickup, and may remotely unlock the door(s) at drop-off as well. In one scenario, all unlocking could be initiated from the server of the trip provider system. In another scenario, unlocking can be enabled via communication between the user's device and the vehicle where the trip provider system supports the process. By way of example, this could require a user authentication that would employ a code or other electronic key sent from the user's device via the API to the trip provider system server, and then to the vehicle. Alternative to such an API-based unlocking scheme, there is also the option of direct communication between the end user's device and the vehicle, for instance using BLE or NFC technology. This approach could potentially be faster while being able to handle cell network dead zones and/or temporary network issues.

If only one delivery is to be made, then the system or the vehicle may select whether to open a particular door or the trunk so that the order can be placed inside. Depending on the vehicle type and type(s) of items to be delivered, cargo-related modifications can be made to the vehicle prior to delivery, e.g., removing or folding down the seats. Containers that hold the customer's goods could be positioned in the vehicle for convenient loading and unloading. In situations where the vehicle is picking up from different stores or is delivering to different customers, each delivery may be assigned its own locker, bin or other compartment of the vehicle. In this scenario, an employee of the restaurant may coordinate via the API or directly with the vehicle to have it open a door or truck so that employee 1112 can place the order in the assigned compartment. For certain types of items, such as prescriptions, the delivery service may request the use of packaging that does not list the names of the drugs (or possibly the recipient) on the outside. Here, a bar code or QR code could be employed on the user-facing packaging. Alternatively, these or other types of packages may be selected for delivery in non-batched trips.

In one scenario, the backend server of the trip provider system may assign the compartment for an item to be delivered. This may be especially helpful for vehicles that do not come equipped with sensors that can detect which parts of the car have been loaded. In this case, the system could to pick a compartment, send instructions to the loader (e.g., store personnel or machine at the store). By way of example, there may be a delivery locker in the vehicle's trunk. The locker may have a set of different compartments. The server would assign compartments to different deliveries (or different items of one delivery). Or alternatively, the system may allow any unused comportment to be chosen and loaded at the item pickup point, which effectively assigns the item to a given compartment by whoever loads the item into the vehicle. In this case, the vehicle could trigger the locker to unlock upon arrival at the item pickup point and again at the delivery point (which could be based on other criteria, such as API signal to unlock, direct communication from mobile device, an access code, etc. as discussed above).

The planner/trajectory module may make certain pullover decisions depending on where the delivery locker is positioned in the vehicle and what the pullover location looks like when the vehicle is arriving. For instance, if the delivery locker is accessible by the rear passenger door, and if there is sufficient room at the curb, the vehicle could perform a side pullover that results in easy access to the side door. In contrast, if the delivery locker is only accessible from the truck and the selected spot would make it difficult to open the trunk (e.g., due to a car parked in the spot behind the selected spot in a parallel parking situation, then the vehicle may look for another pullover location that has more room to access the trunk. The planner/trajectory module may support maneuvering capabilities that allow the vehicle to park nose in or back in, which could be particularly helpful when loading or unloading large or bulky items.

One issue to consider with these types of situations is how long should the vehicle wait, either to pick up a rider or wait for a delivery to be placed in the vehicle. In one scenario, the system may send one or more reminders to the rider or to the partner entity (e.g., the restaurant or the pharmacy) that the vehicle is on site and waiting. The vehicle may have a default wait time (e.g., 2-5 minutes), which may be extended (e.g., by up to 10-20 minutes). This could be done if the rider or partner entity responds to the reminder(s). In some situations, the vehicle may not be able to remain at the pickup location, such as due to a regulatory restriction in a pickup zone. In this case, the vehicle may need to move to a different spot (if available).

In other situations, whether to wait and how long to wait may depend on the type of item is being delivered, or there may be jurisdiction-specific regulations regarding parking, stopping or standing. By way of example, if an item is perishable or has a narrow delivery window (e.g., for food deliveries, frozen goods, or medications), the system may extend the wait time by a few minutes. When batching multiple deliveries in one trip, the system may prioritize delivering orders with frozen goods/cooked food before orders with only nonperishable goods. A decision by the vehicle or the back-end system regarding waiting may also be accompanied by different notifications from the system or vehicle to the partner entity or the customer expecting the delivery. Thus, if a food delivery is late to be placed into the vehicle because the restaurant was busy, the customer may be notified once the food has been placed in the vehicle and given an updated ETA for the delivery time. And if a delivery is not timely received or otherwise there is no response to the reminders, the trip may be cancelled and the end customer notified accordingly.

FIG. 12 illustrates a method 1200 according to aspects of the technology. At block 1202, the method includes receiving, by a trip provider system via an application programming interface, a request from a partner entity to schedule a trip from a pickup location to a destination at a particular time. The partner entity has a partner account with the trip provider system. At block 1204, the method includes scheduling the trip from the pickup location to the destination, the scheduling including adding trip information to a trip database. At block 1206, the method includes evaluating, in response to the scheduling, availability of one or more autonomous vehicles to support the trip at the particular time. At block 1208, the method includes issuing, prior to the particular time, a command to a selected autonomous vehicle of the one or more autonomous vehicles according to the evaluated availability. The command includes trip information including at least the pickup location and the destination so that the selected autonomous vehicle can carry out the trip. And at block 1210, the method includes issuing, by trip provider system, status information to either the partner entity or a customer for the trip. The status information includes identifying information regarding the selected autonomous vehicle and an estimated arrival time at either the pickup location or the destination.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method, comprising:
receiving, by one or more processors of a trip provider system via an application programming interface, a request from a partner entity to schedule a trip for a ride or delivery from a pickup location to a destination at a particular time, the partner entity having a partner account with the trip provider system, the partner entity being an entity that needs trip services to provide the trip associated with its goods or services;
scheduling, by the one or more processors, the trip from the pickup location to the destination, the scheduling including adding trip information to a trip database;
evaluating, by the one or more processors in response to the scheduling, availability of one or more autonomous vehicles to support the trip at the particular time;
issuing, by the one or more processors prior to the particular time, a command to a selected autonomous vehicle of the one or more autonomous vehicles according to the evaluated availability, the command including trip information including at least the pickup location and the destination so that the selected autonomous vehicle can carry out the trip;
issuing, by the one or more processors of the trip provider system, status information to either the partner entity or a customer for the trip, the status information including identifying information regarding the selected autonomous vehicle and an estimated arrival time at either the pickup location or the destination; and
navigating, based on the command, the selected autonomous vehicle to the pickup location at the particular time.

2. The method of claim 1, wherein scheduling the trip further includes adding the trip to a trip queue.

3. The method of claim 2, wherein:
the request to schedule the trip includes a request to create a recurring trip; and
scheduling the trip includes adding separate instances of the trip to the trip queue in accordance with the request to create the recurring trip.

4. The method of claim 3, further comprising removing past instances of the recurring trip from the trip queue.

5. The method of claim 1, further comprising, prior to scheduling the trip, determining whether an agent of the partner entity who initiated the request is authorized to schedule the trip.

6. The method of claim 5, wherein determining whether the agent is authorized to schedule the trip includes confirming whether the agent is authorized to schedule the trip either from the pickup location or to the destination.

7. The method of claim 1, wherein the request for the trip is a request to deliver food or a package.

8. The method of claim 1, wherein the request for the trip is a request to pick up a passenger from the pickup location and transport the passenger to the destination.

9. The method of claim 1, wherein issuing the status information to the partner entity includes identifying at least one previously scheduled trip and transmitting the status information to the partner entity via the application programming interface.

10. The method of claim 1, wherein issuing the status information to the customer includes transmitting the status information to a client device of the customer.

11. The method of claim 1, wherein the request to schedule the trip includes a request to create a trip having multiple stops to pick up deliveries from different locations.

12. The method of claim 1, wherein the status information identifies a compartment of the vehicle that contains an item to be delivered to the destination.

13. The method of claim 1, wherein the status information indicates whether the selected autonomous vehicle will extend a wait time at the pickup location.

14. The method of claim 1, further comprising, prior to receiving the request to schedule the trip, issuing a list of pre-set locations to the partner entity for which a user can manage trips.

15. The method of claim 1, wherein evaluating the availability of one or more autonomous vehicles includes determining a feasibility of each autonomous vehicle to pick up multiple orders for a single trip.

16. The method of claim 1, wherein evaluating the availability of one or more autonomous vehicles includes analyzing a threshold time or distance requirement for a person to reach either the pickup location or the destination.

17. The method of claim 1, wherein evaluating the availability of one or more autonomous vehicles includes evaluating whether a cargo-related modification can be made to the selected autonomous vehicle.

18. A trip provider system, comprising:
- a trip database configured to maintain one or more trip tables for trips serviced by a fleet of autonomous vehicles; and
- one or more first processors operatively coupled to the database, the one or more first processors configured to:
  - receive, via an application programming interface, a request from a partner entity to schedule a trip for a ride or delivery from a pickup location to a destination at a particular time, the partner entity having a partner account with the trip provider system, the partner entity being an entity that needs trip services to provide the trip associated with its goods or services;
  - schedule the trip from the pickup location to the destination, including adding trip information to the trip database;
  - evaluate, in response to the scheduling, availability of one or more autonomous vehicles to support the trip at the particular time;
  - issue, prior to the particular time, a command to a selected autonomous vehicle of the one or more autonomous vehicles according to the evaluated availability, the command including trip information including at least the pickup location and the destination so that the selected autonomous vehicle can carry out the trip; and
  - issue status information to either the partner entity or a customer for the trip, the status information including identifying information regarding the selected autonomous vehicle and an estimated arrival time at either the pickup location or the destination; and
- one or more second processors configured to:
  - navigate, based on the command, the selected autonomous vehicle to the pickup location at the particular time.

19. The trip provider system of claim 18, wherein:
the request to schedule the trip includes a request to create a recurring trip; and
the one or more first processors are configured to schedule the recurring trip by adding separate instances of the trip to a recurring trip table in the trip database in accordance with the request.

20. The trip provider system of claim 18, wherein issuance of the status information to the partner entity includes identification at least one previously scheduled trip and transmission of the status information to the partner entity via the application programming interface.

* * * * *